US009507332B2

(12) United States Patent
Shimota et al.

(10) Patent No.: US 9,507,332 B2
(45) Date of Patent: Nov. 29, 2016

(54) MULTI-USE ACTIVE TOOL ASSEMBLY

(71) Applicant: Wilson Tool International Inc., White Bear Lake, MN (US)

(72) Inventors: Jon M. Shimota, Stillwater, MN (US); John H. Morehead, New Richmond, WI (US); Brian J. Lee, Elk River, MN (US)

(73) Assignee: Wilson Tool International Inc., White Bear Lake, MN (US)

( * ) Notice: Subject to any disclaimer, the term of this patent is extended or adjusted under 35 U.S.C. 154(b) by 12 days.

(21) Appl. No.: 14/449,768

(22) Filed: Aug. 1, 2014

(65) Prior Publication Data

US 2016/0034790 A1 Feb. 4, 2016

(51) Int. Cl.
*G05B 15/02* (2006.01)
*B41J 2/175* (2006.01)

(52) U.S. Cl.
CPC .............. *G05B 15/02* (2013.01); *B41J 2/1752* (2013.01); *Y10T 29/5155* (2015.01); *Y10T 483/13* (2015.01)

(58) Field of Classification Search
None
See application file for complete search history.

(56) References Cited

U.S. PATENT DOCUMENTS

| 3,788,760 A | 1/1974 | Daniels |
| 3,847,078 A | 11/1974 | Krembel, Jr. |
| 4,656,463 A | 4/1987 | Anders et al. |
| 4,742,470 A | 5/1988 | Juengel |
| 4,823,658 A | 4/1989 | Spicer |
| 5,046,014 A | 9/1991 | Anjo |
| 5,201,589 A | 4/1993 | Chun |
| 5,215,513 A | 6/1993 | Maynard |
| 5,224,915 A | 7/1993 | Killian |
| 5,259,100 A | 11/1993 | Takahashi |
| 5,342,276 A | 8/1994 | Fujiwara |
| 5,451,195 A | 9/1995 | Fujiwara |
| 5,457,484 A | 10/1995 | Regnault |
| 5,555,759 A | 9/1996 | Rosene |
| 5,575,168 A | 11/1996 | Rosene |
| 5,682,657 A | 11/1997 | Hirose |
| 5,682,782 A | 11/1997 | Rosene |

(Continued)

FOREIGN PATENT DOCUMENTS

| DE | 8508544 U1 | 5/1985 |
| EP | 0394925 B1 | 7/1994 |

(Continued)

OTHER PUBLICATIONS

Dalemark Industries, Inc., "High Resolution Ink Jet Coding System," Nov. 25, 2002, 11 pages.
EBS Ink-Jet Systems product brochure for Handjet EBS-250, 2005.
Messer, MG Systems & Welding, Inc., Brochure entitled "Ink Jet Marker, Fast, quiet marking with no damage to the plate surface," copyright 2006 Messer MG Systems & Welding 12061M, Menomonee Falls, WI.

(Continued)

*Primary Examiner* — An Do
*Assistant Examiner* — Renee I Wilson
(74) *Attorney, Agent, or Firm* — Fredrikson & Byron, P.A.

(57) ABSTRACT

A tool assembly incorporating active tool, whereby the assembly can be operated with a variety of machining apparatus but just as well can be manually operated by a user. The tool assembly in some uses can be used for printing, whereby one or more of a power source and an ink source can be configured as insertable/removable cartridges that can be used with the assembly. Additionally, in such case, an ink management module can be used with the tool assembly to regulate the flow of ink from the ink source to a functional head of the assembly. The tool assembly can also include a user interface, which, along with a communication module, can enable the assembly to be actuated directly or via wireless communication.

42 Claims, 20 Drawing Sheets

(56) References Cited

U.S. PATENT DOCUMENTS

| | | | |
|---|---|---|---|
| 5,721,587 | A | 2/1998 | Hirose |
| 5,808,642 | A | 9/1998 | Zaba |
| 5,810,704 | A | 9/1998 | Seto |
| 5,993,090 | A | 11/1999 | STraka |
| 7,011,613 | B2 | 3/2006 | Moller |
| 7,168,364 | B2 | 1/2007 | Schneider |
| 7,171,738 | B2 | 2/2007 | Dick et al. |
| 7,249,478 | B2 | 7/2007 | Takehara |
| 7,367,761 | B2 | 5/2008 | Kato |
| 7,437,210 | B1 | 10/2008 | Shigefuji |
| 7,614,725 | B2 | 11/2009 | Schulmeister |
| 8,505,175 | B2 | 8/2013 | Lee et al. |
| 2008/0269031 | A1* | 10/2008 | Lee ................ B21D 28/002 483/7 |

FOREIGN PATENT DOCUMENTS

| | | |
|---|---|---|
| EP | 1125682 A2 | 8/2001 |
| EP | 1219433 A1 | 7/2002 |
| EP | 1219439 A1 | 7/2002 |
| EP | 1219432 A1 | 4/2005 |
| JP | H06-198357 | 7/1994 |
| WO | 9948694 | 9/1999 |

OTHER PUBLICATIONS

REA-JET, "Features of Performance," Dec. 2002 or earlier, 3 pages.
Website, http://www.mg-systems-welding.com/products.html, viewed Apr. 18, 2008.
Website, http://www.mg-systems-welding.com/marking.html, viewed Apr. 18, 2008.
Website, http://www.mg-systems-welding.com/inkjet.html, viewed Apr. 18, 2008.
Website, http://www.mg-systems-welding.com/tmc4500.html, viewed Apr. 18, 2008.
Website, http://www.mg-systems-welding.com/mpc2000.html, viewed Apr. 18, 2008.
Website, http://www.mg-systems-welding.com/titan.html, viewed Apr. 18, 2008.
Website, http://www.mg-systems-welding.com/metalmasterplus.html, viewed Apr. 18, 2008.
Website, http://www.midaprobing.com/product_en.htm, viewed Apr. 18, 2008.
Website, http://www.midaprobing.com/Transmission_sys_en.htm, viewed Apr. 18, 2008.
Website, http://www.midaprobing.com/news_en.htm, viewed Mar. 30, 2007.
International Search Report and Written Opinion for International Application No. PCT/US2008/061434, dated Jul. 3, 2008, 11 pages.

* cited by examiner

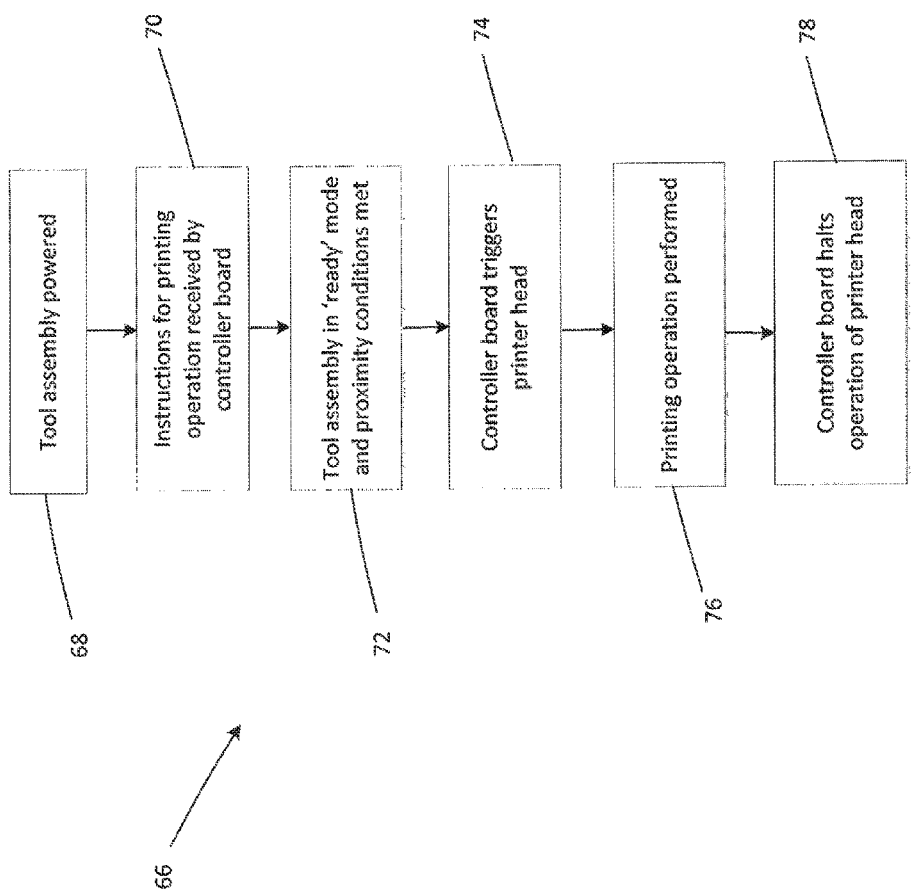

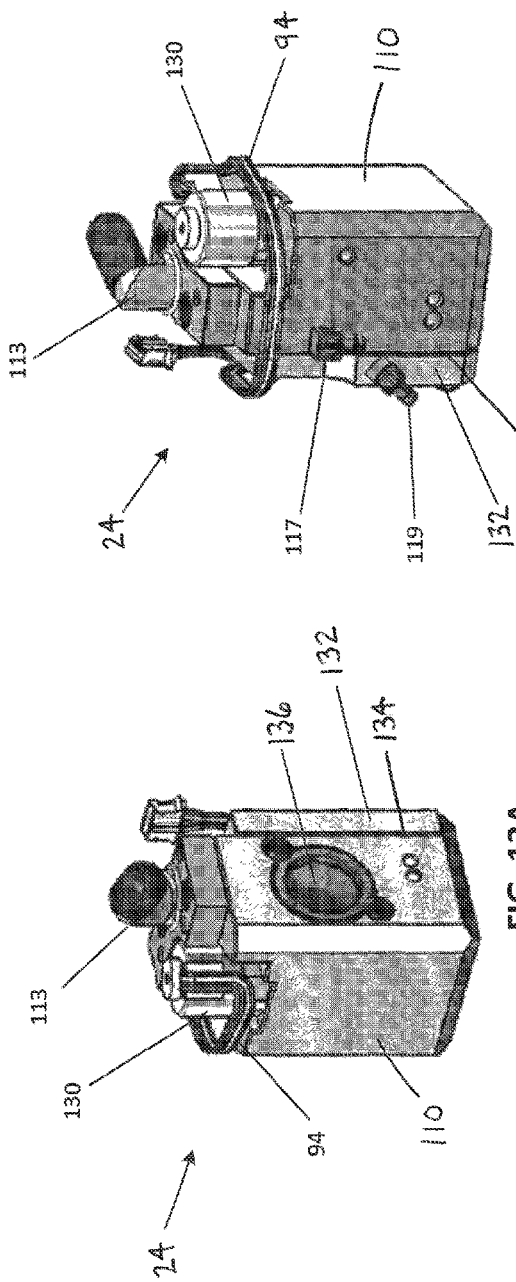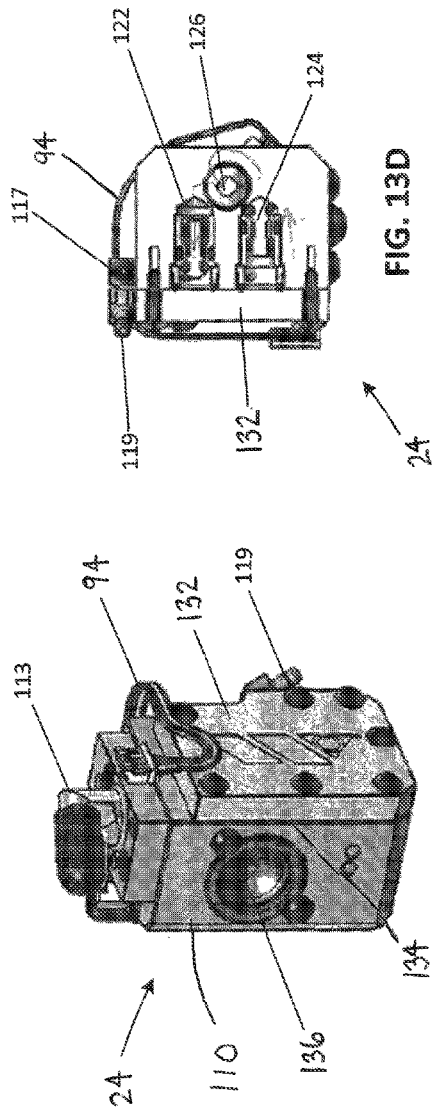

MULTI-USE ACTIVE TOOL ASSEMBLY

FIELD OF THE INVENTION

The present invention generally relates to a tool assembly. More particularly, this invention relates to a tool assembly with active tool that can be operably mounted and used on industrial machines, or used independent of such machines.

BACKGROUND

Ram-driven presses, for example, punch presses, are well known in the art. Punch presses are typically configured to hold a plurality of tools for machining components from sheet workpieces, for example, sheet metal. Such machining generally involves forming holes in such sheet workpieces and/or deforming such sheet workpieces into a variety of shapes and sizes, e.g., via indentations made therein. Tools used in this machining commonly involve a punch and die, whereby the punch and corresponding die are mounted in a press and located in working position beneath the ram of the press (in some cases, coupled directly to the ram). To that end, the punch is typically driven, according to a pre-programmed ram stroke, to fabricate sheet workpieces located between the punch and die.

Product designs, which incorporate components formed from sheet workpieces, often require that a number of different types of deformations and/or holes be formed with respect to each of the workpieces in forming the components. As such, punch presses used in processing these workpieces commonly employ a plurality of tools mounted therein for each workpiece. In such cases, the press is often programmed to sequentially move a variety of tools, as warranted for a particular workpiece, into and out from the working position of the press, for example, via rotation of a turret, in a turret-type press, via manipulation of a multi-tool in a single station press, or via selection and replacement of tools from a tool magazine of a press.

Components formed from sheet workpieces can often include, in addition to the aforementioned deformations and/or holes, one or more value-adding features, for example, an informational marking. Such value-added features may be provided prior to fabrication, when the workpiece is still in sheet form, or following fabrication. The additional steps of providing value-added features, if not carefully considered, can significantly add to the fabrication cost of the components. Thus, there is a need for assemblies and methods which can facilitate efficient and diverse approaches to providing such features.

SUMMARY OF THE INVENTION

Embodiments of the invention involve a tool assembly incorporating active tool, whereby the assembly can be operated with a variety of machining apparatus but just as well can be manually operated by a user.

In one embodiment, a tool assembly configured for performing a function on an object is provided. The tool assembly comprises an active tool comprising a microprocessor and a functional head electrically coupled to the microprocessor. The assembly also comprises a power source that is electrically coupled to the microprocessor for powering the functional head, and a housing including a first portion and a second portion. The second portion contains the functional head, and the first portion is defined as an internal web that divides the first portion into a plurality of separate compartments. A first of the compartments accommodates the microprocessor, a second of the compartments is sized to accommodate the power source, and a third of the compartments is sized to accommodate at least one item relating to operation of the functional head. The second and third compartments are open to an exterior of the first portion, and thereby define respective recesses. The power source and the at least one item related to operation of the functional head are housed in separate cartridges that are selectively insertable within or removable from corresponding of the recesses.

In another embodiment, a tool assembly configured for performing a function on an object is provided. The tool assembly comprises an active tool comprising a microprocessor, a functional head electrically coupled to the microprocessor, and a communications module electrically coupled to the microprocessor, wherein the communications module is configured to communicate wirelessly. The assembly also comprises a power source that is electrically coupled to the microprocessor for powering the functional head, and a housing containing the microprocessor, the communications module, the power source, and the functional head. The tool assembly also comprises a user interface located on an outer surface of the first portion and electrically coupled to the microprocessor. The microprocessor is configured to receive programming instructions both directly from the user interface and indirectly from the communications module.

In an additional embodiment, a tool assembly configured for performing a printing operation on an object is provided. The tool assembly comprises an active tool comprising a microprocessor and a functional head electrically coupled to the microprocessor. The assembly also comprises a power source being electrically coupled to the microprocessor for powering the functional head, and an ink source. The assembly also comprises a housing containing the microprocessor, the communications module, the power source, the ink source, and the functional head. The assembly also comprises an ink management module contained within the second portion and fluidly coupling the ink source and the functional head. The microprocessor is electrically coupled to the ink management module so as to regulate flow of ink from the ink source to the module.

In a further embodiment, a method of performing a function on an object via a tool assembly is provided, whereby the tool assembly is manually operated by a user. The method comprises the steps of providing a tool assembly. The assembly comprises an active tool comprising a microprocessor and a functional head electrically coupled to the microprocessor. The assembly also comprises a power source electrically coupled to the microprocessor, and a housing containing the microprocessor, the power source, and the functional head. The tool assembly also comprises a user interface located on an outer surface of the first portion and electrically coupled to the microprocessor, and a plunger operably coupled to the first portion and selectively displaceable relative to the first portion in event of force applied to a surface of the plunger. The method also comprises the steps of interfacing the user interface so as to power the microprocessor, applying a force on the plunger such that the plunger moves relative to the first portion and interfaces with and thereby activates the microprocessor, and moving a distal end of the second portion within predetermined proximity of the object.

BRIEF DESCRIPTION OF THE DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

FIG. 10 is a flowchart showing steps for a method of printing indicia with tool assemblies in accordance with certain embodiments of the invention;

FIGS. 13A-13D are front, rear, and side perspective views, and bottom plan view, respectively, of one physical version of the ink management module of FIG. 12 in accordance with certain embodiments of the invention;

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and other elements employ that which is known to those of ordinary skill in the field of the invention. Those skilled in the art will recognize that many of the noted examples have a variety of suitable alternatives.

Figure 1:
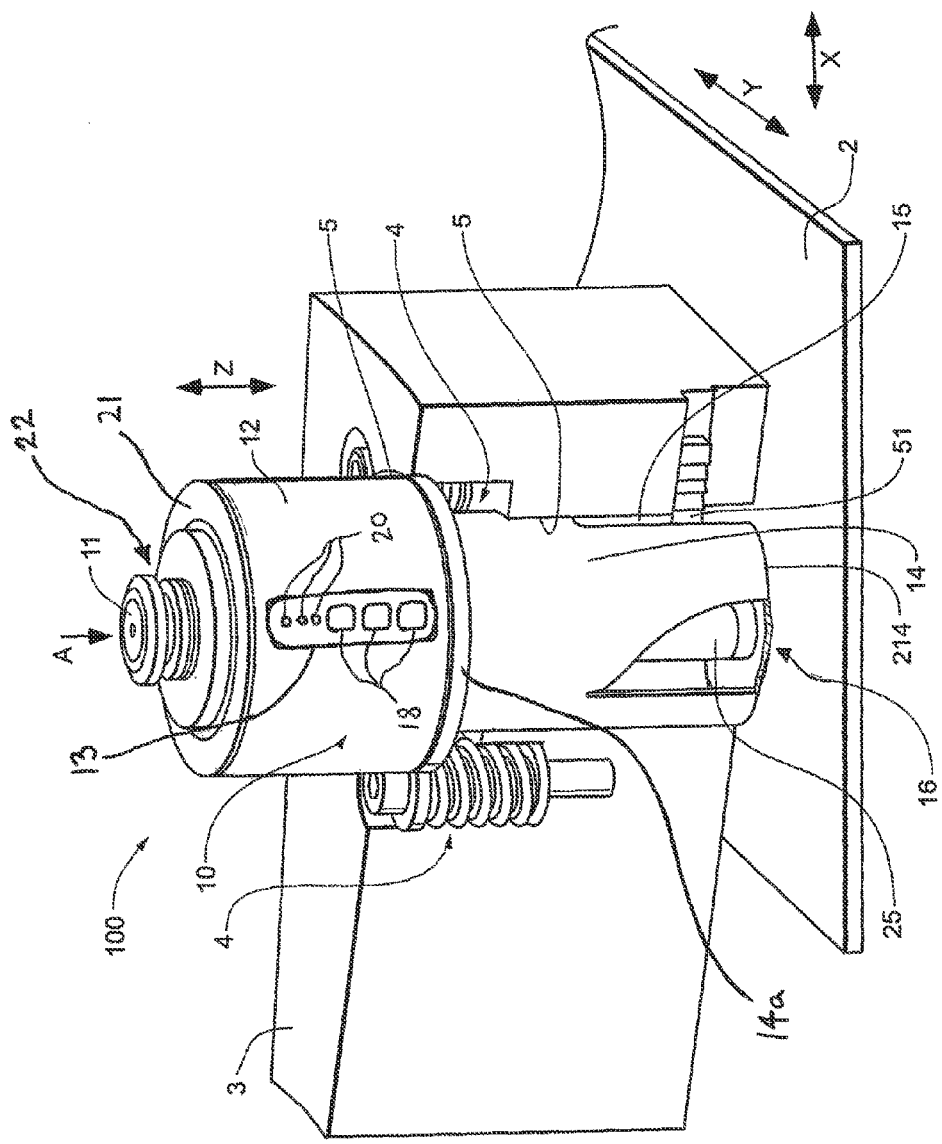
FIG. 1 is a perspective view of a tool assembly in accordance with certain embodiments of the invention, with the tool assembly exemplarily shown loaded in a portion of an industrial punch press.

FIG. 1 is a perspective view of a tool assembly 100 assembled into a portion of an industrial punch press in accordance with certain embodiments of the invention. As shown, the press portion, or upper turret 3, is cut away along a bore 5 thereof, in order to illustrate the tool assembly 100, used for performing an operation on a sheet workpiece 2. The tool assembly 100 is configured to extend through the bore 5, and is configured to rest on lifter springs 4 mounted within and about a periphery of the bore 5. While not shown in FIG. 1, those skilled in the art will understand that an entirety of the upper turret 3 would typically include a plurality of additional bores (e.g., larger, smaller, or similar in diameter to bore 5) arranged about a central axis of the turret. While also not shown, the press (involving upper turret 3) would be further understood to include, among other components, a table that supports and moves the workpiece 2 in X- and Y-directions, a lower turret that resides below upper turret 3, and a ram or striker. Each of the additional bores of the upper turret 3 would typically accommodate a separate punch portion of a tool assembly, while the lower turret would typically accommodate die portions of the tool assembly. To that end, when any of the upper turret bores are located beneath the striker of the press, the striker may drive the corresponding punch portion in the bore against a workpiece (positioned between the punch portion and selected die portion) to form an indentation or a hole therein.

In certain embodiments, the tool assembly 100 of FIG. 1 involves a marking tool. Regarding the marking tool, it incorporates an 'active' tool as opposed to a 'passive' tool. A passive tool as referenced herein means a tool, such as a punch, that performs a function on a workpiece by passively responding to a ram stroke of a press in which the tool is mounted. In contrast, an active tool as referenced herein means a tool which is controlled by elements, e.g., an integrated computer or microcontroller, contained within the tool assembly itself, whereby such control leads the tool to perform a function with respect to a workpiece. As will be further detailed herein, providing such controlling elements within the tool assembly 100 enables the functionality and use of the assembly 100 to be significantly enhanced, particularly, for example, with further inclusion of user interface 13 on a front side of the assembly 100. While further specifics are provided later, one function of the user interface 13 is providing a means of energizing the assembly 100 for operation, e.g., via 'power' button. Given this capability, the assembly 100 can be powered up for performing operation whenever and wherever the user sees the need.

In addition, the self-contained nature of the tool assembly 100 permits use of the assembly 100 in a diverse number of applications. For example, due to its design, the tool assembly 100 can be readily used with a variety of machining apparatus. Particularly, the assembly 100 is easily loaded or removed from such apparatus so as to be freely interchangeable with another tool assembly, including a 'passive' tool, or alternatively, a further 'active' tool. To that end, although FIG. 1 shows the tool assembly 100 being used in a turret-style punch press, the assembly 100 could just as well be used in other styles or types of press machines (including single station machines), other machining apparatus, or separate from such machining apparatus, by a user.

Turning back to FIG. 1, the housing 10 of the tool assembly 100 can include a first (e.g., upper) portion 12 and a second (e.g., lower) portion 14. In certain embodiments, the first and second portions 12, 14 are separable bodies, yet operatively joined together for use of the assembly 100, e.g., via series of fasteners extending from an outer lip 14*a* of the second portion 14 and into outer edge regions of the first portion 12. However, the invention should not be limited to such. For example, the housing 10 can be formed as a single integral body, yet still have first and second portions 12, 14 (e.g., upper and lower portions) thereof. Alternatively, the housing 10 can include more than two portions, e.g., where one or more of the first and second portions 12, 14 are further separable into a plurality of sub-bodies. With reference back to FIG. 1, further coupled to the first portion 12 (e.g., via fasteners) is a cover 21 which supports an assembly with surface 11 configured to receive a downward force in Z-direction, e.g., such as a ram-stroke A of the press. In certain embodiments as shown, the surface 11 protrudes from the cover 21 and has a circumference smaller than that of the cover 21. To that end, the surface 11 is configured to be a target for such downward force, and as a result of the force, the surface 11 is vertically displaced. Such vertical displacement of the surface 11 in turn causes the tool assembly 100 to be activated, or set in a 'ready' mode for operation. In such 'ready' mode, the assembly 100 is disposed to perform its intended function in accordance with operating instructions (e.g., stored in memory and/or transmitted from remote computing device). Specifics of this will be later detailed herein.

When used in a ram-driven press as shown, the downward movement of the surface 11 can further cause the tool assembly 100 to be moved downward so as to be positioned in requisite proximity to the workpiece 2 for performing an operation thereon. For example, in certain embodiments, initial downward movement of the surface 11 occurs relative to the cover 21. However, following continued application of downward force on the surface 11 (via downward ram stroke), the housing 10 of the tool assembly 100 and the active tool therein are correspondingly forced downward such that an operation can be performed on the workpiece 2. The surface 11 can be biased such that when downward force applied thereto is removed, the surface 11 automatically returns to its original height relative to the cover 21, thereby ending the 'ready' mode period for the assembly 100. To that end, the surface 11 can be thought of as an upper surface of a plunger 22, whereby such plunger is configured to return to its initial state after being depressed. As will perhaps be better appreciated from later description herein, the size and shape of the plunger 22 can vary depending on the intended use of the assembly 100. Turning to the second portion 14 of the tool assembly 100, in certain embodiments as shown, it extends from the first portion 12 through the bore 5. Those skilled in the art will appreciate that the tool assembly 100, as shown, has been 'dropped' (or loaded) into the bore 5, e.g., having been oriented therein by a key 51 of upper turret 3 interfacing with a mating slot 15 formed in second portion 14 of the housing 10. Although the housing 10 of the tool assembly 100 is shown as having a cylindrical form, it should be noted that the invention is not so limited, whereas any suitable geometry for the housing 10 may be employed for embodiments of the present invention.

FIG. 1, via a cut-away portion of the housing second portion 14, further illustrates a functional head 25 of the active tool of the tool assembly 100. The functional head 25, in certain embodiments as shown, is contained within the second portion 14, and oriented to perform a function with respect to the workpiece 2 through an opening 16 (hidden from view in FIG. 1) formed in a bottom surface of the second portion 14. As described above, in certain embodiments, the tool assembly 100 involves a marking tool (e.g., for printing) and incorporates an active tool. Further, in certain embodiments, the functional head 25 is controlled by a microprocessor (or microcontroller) contained by the housing 10, which will be further detailed herein.

With continued reference to FIG. 1, in cases by which the tool assembly 100 provides a marking (e.g., printing) function on the workpiece 2, physical contact between the functional head 25 and the workpiece 2 is not required. For example, in certain embodiments, when the tool assembly 100 is loaded into the bore 5 of the upper turret 3, a pre-programmed travel of ram-stroke A relative to the surface 11 only needs to correspondingly move the assembly 100 (and functional head 25 therein) within sufficient proximity of the workpiece 2 so as to carry out a marking operation. Conversely, a pre-programmed travel of another ram-stroke of the same press, when applied to a passive tool assembly mounted or loaded within the press (e.g., in another bore of upper turret 3) dictates the forming tool of that assembly (for example, a punch acting in concert with associated die) to contact the workpiece, i.e., so as punch through or deform a thickness of it.

As described above, one function that the functional head 25 may perform on the workpiece 2, yet not result in contact with the workpiece 2, includes marking (e.g., printing or laser marking), but also could involve other functions, such as information collection. To that end, while embodiments described herein focus on configurations of the assembly 100 for marking of indicia on workpieces, the tool assembly 100 could be similarly configured for other functionality, such as information collection. Alternatively, in certain embodiments, the tool assembly 100 can be adapted to be multi-functional. For example, while not shown, the assembly 100 can be configured to have multiple (e.g., two or more) functional heads 25 contained within the second portion 14, which may be actuated separately or together (or in sub-groups if there are more than two functional heads). By way of example, for the purpose of marking, the functional head 25 can be a printer head or cartridge, an etching head, or a laser. Conversely, for purposes of information collection, the functional head 25 can be a bar code reader, a camera, a touch probe, or a laser.

Figure 2:
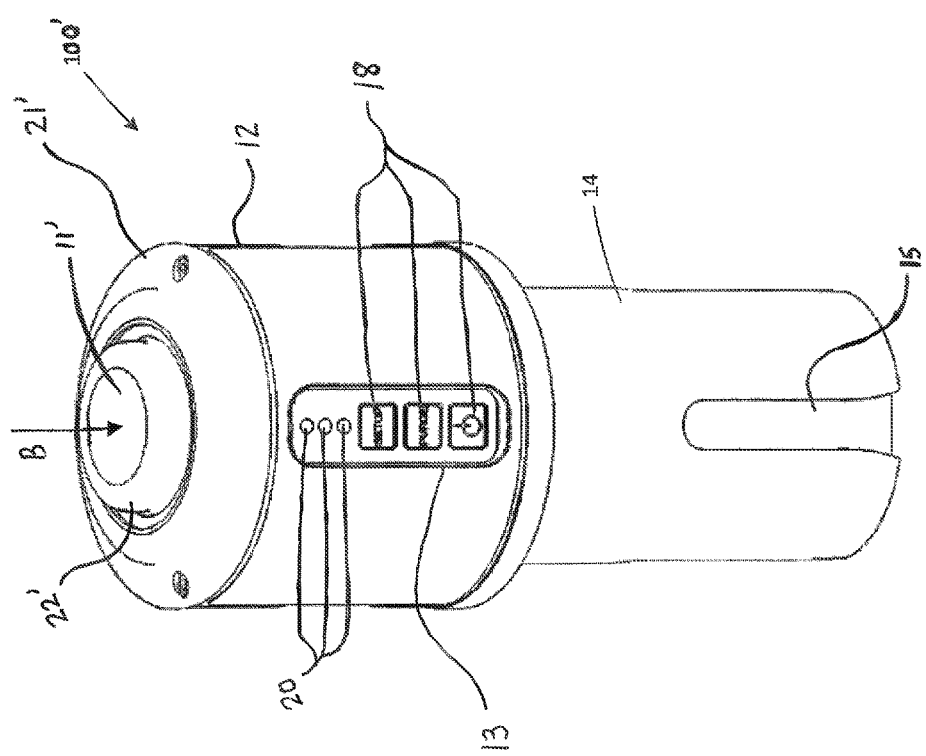
FIG. 2 is a perspective view of another tool assembly in accordance with certain embodiments of the invention.

FIG. 2 is a front perspective view of another tool assembly 100' in accordance with certain embodiments of the invention, while FIGS. 3-8 show further views of the assembly 100' or parts thereof. The tool assembly 100' of FIG. 2 is similar to the tool assembly 100 of FIG. 1 in most respects, but for variations relating to its top surface 11' and underlying cover 21'. As will be further described herein, these variations enable the tool assembly 100' to be more easily operated by a user, i.e., manual operation of the assembly 100'. However, it should be understood that the description herein, whether focusing on the tool assembly 100 of FIG. 1 or the tool assembly 100' of FIG. 2, is mutually applicable to both of the assemblies 100, 100' despite the variations relating to their top surfaces 11, 11' and underlying covers 21, 21'. To that end, while the design variations ease the process of manually operating the tool assembly 100' (as described below), the assembly 100' can just as well be used with machining apparatus, if warranted.

Continuing with the above (and similar to that already described for tool assembly 100), the surface 11' of tool assembly 100' is configured to receive a downward force so as to be vertically displaced, and thereby cause the tool assembly 100' to be in 'ready' mode for operation. However, while the surface 11' of the tool assembly 100' is sized similar to the corresponding surface 11 of tool assembly 100 of FIG. 1, the underlying body of the plunger 22' is different. As described above, size/shape of the plunger can vary depending on the intended use of the tool assembly, which is a consideration with the tool assembly 100'. For example, by designing the plunger 22' to have a tighter profile to the cover 21' of the first portion 12, the tool assembly 100' is configured to be more easily handled and thereby manually operated by a user. In such case with reference to FIG. 3 (showing an elevation view of the tool assembly 100'), a user can grasp opposing sides (and/or undersides) of the first portion 12, while exerting downward force B on the surface 11' with the user's thumbs so as to cause the assembly 100' to be in 'ready' mode. Via this example, it should be appreciated that in certain embodiments, the first portion 12 may be formed to have a wider profile than the second portion 14, such that undersides are formed for the first portion 12 (i.e., relative to the second portion 14) for a user to grasp (such that the portion 12 can be supported with the user's fingers, e.g., on opposing sides of the portion 12) while operating the assembly 100' manually.

As noted above, despite the above-described variance in the plunger design, the tool assembly 100' is usable with machining apparatus, e.g., so as to loaded into a bore of an upper turret (similar to that shown with assembly 100 in FIG. 1) and function as intended with the press. Particularly, so long as downward force of ram stroke on the surface 11' brings the functional head 25 within requisite proximity of a workpiece to carry out the intended function thereon, the assembly 100' would be applicable for such press. To that end (and similar to that already described above for the tool assembly 100 of FIG. 1), the tool assembly 100' can be operated to mark workpieces, e.g., before, during (e.g., in one or more steps), and/or after machining processes. Additionally, and similar to the tool assembly 100 of FIG. 1, the tool assembly 100' can be further employed on other machining apparatus (e.g., other than ram-driven presses).

For example, the tool assembly 100' can be operably mounted to a cutting machine. In the case of a cutting machine, such as a laser-cutting machine, the corresponding cutting processes can be prompted via a series of mechanical and/or electrical steps, thereby serving as triggers. In certain embodiments, and similar to that noted above with respect to ram-driven punch presses, one or more of these triggers can be extended to further actuate the tool assembly 100'. However, if desired, the tool assembly 100' could just as well be actuated independent of the triggers for the machining processes. Moreover, while the tool assembly 100' can be incorporated with many varieties of machining apparatus, e.g., so as to be in close proximity for using the tool's function with respect to fabricated components, the assembly 100' can alternatively be used in a single-station machine, such as a single-station press.

Figure 8:
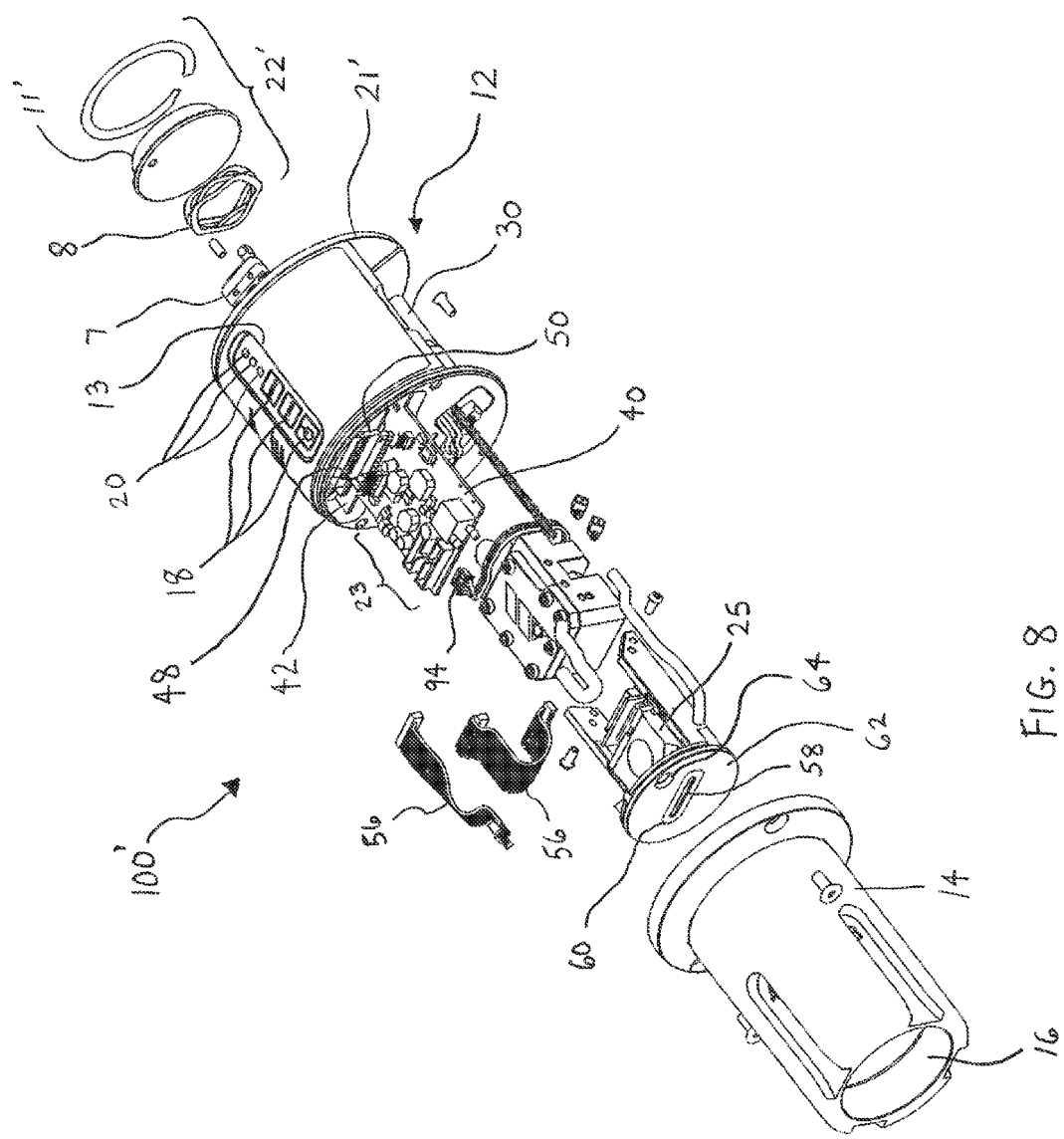
FIG. 8 is an exploded perspective view of the tool assembly of FIG. 2 in accordance with certain embodiments of the invention.

As described above, despite the above-described variance in plunger design, the underlying functionalities of the tool assemblies 100 and 100' are similar. With reference to FIG. 8 (showing an exploded view of the assembly 100'), as the surface 11' is forced downward, a protruding contact (e.g., micro-switch) 7 joined to the underside of plunger 22' is caused to move synchronously with the surface 11'. Via this synchronous movement, the contact 7 is enabled to interface with electronics housed in the first portion 12, which triggers the assembly 100' to be in 'ready' mode, i.e., ready to perform its intended function in accordance with operating instructions. Further, as alluded to above with reference to the assembly 100 of FIG. 1, the surface 11' is resiliently biased (e.g., by spring 8) so as to return to its original height upon removal of the downward force.

Thus, and as alluded to above, while the tool assemblies 100, 100' are depicted with differing plunger designs 22, 22' (as illustrated in the figures), the invention should not be limited to such. To the contrary, tool assemblies of the invention are generally applicable to any plunger configuration designed therefor. What should be appreciated, however, is the versatility afforded to the tool assemblies of the invention, for example, whereby they can be used with many differing types of machining apparatus, but just as well can be manually operated by a user, i.e., following steps similar to those performed when the assemblies are used in machining apparatus or a single-station press. However, in the case of manual use, because the user performs the task of holding the housing 12, upon application of downward force B on the surface 11', the user would further need to manually position the assembly 100' within sufficient proximity of the workpiece (or other object) for the intended function to be performed thereon.

Figure 3:
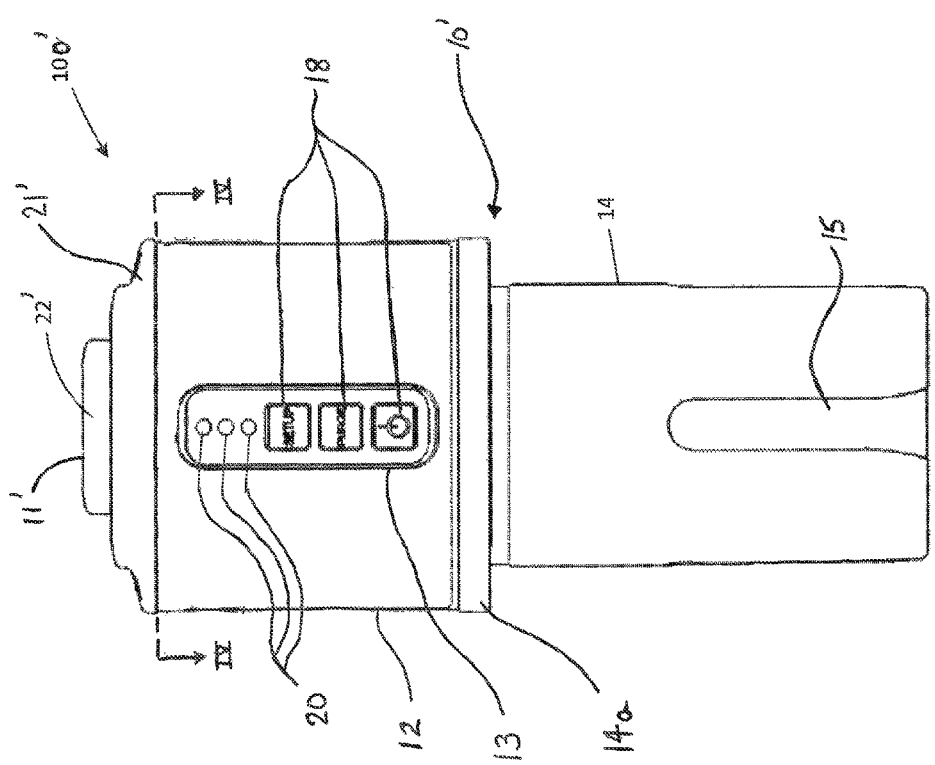
FIG. 3 is a front elevation view of the tool assembly of FIG. 2.

With further reference to FIGS. 2 and 3 (and similarly applicable to the tool assembly 100 of FIG. 1), the first and second portions 12, 14 of the tool assembly 100' are each canisters. With reference to FIG. 8 (showing an exploded view of the tool assembly 100'), the first portion 12 is configured to house electronic controls 23 (e.g., controller and communication boards), while the second portion 14 is configured to house the functional head 25'. With continued reference to FIG. 8, and in the particular case of the tool assembly 100' involving a marking tool that utilizes ink, the second portion 14' can be configured to house an ink management module 24. Specifics regarding the module 24 and its functioning will be further detailed herein.

However, prior to that, we turn back to the user interface 13 of the tool assembly 100' (and the tool assembly 100 of FIG. 1). In certain embodiments as shown, the interface 13 includes a series of push buttons 18 and light indicators 20. However, the invention should not be limited to such. For example, an entirety (or one or more portions) of the user interface 13 can take the form of a touch display (e.g., as commonly used with computing tablets), whereby one or more of the push buttons 18 (as well as the indicators 20) could be shown on the display, and the buttons 18 could be actuated by the operator via simple touch action. Looking back to FIGS. 2 and 3, in the case of the push buttons 18 being depressible buttons, each are electrically coupled to the electronic controls 23 of the assembly 100' (as will be later described), and in certain embodiments enable the user to power as well as pre-configure the assembly 100 for its operations. Similarly, the light indicators 20 are electrically coupled to the controls 23, and in certain embodiments provide operation statuses of the assembly 100' to the user.

To that end, in certain embodiments, the indicators 20 can incorporate light-emitting diodes (LEDs). These features and their corresponding functioning will be further described herein. However, at this point, it should be understood that the user interface 13, via its push buttons 18 and light indicators 20, provides valuable control and information for a user, regardless of whether the tool assembly 100' is loaded in a machining apparatus, such as a press, or manually operated by the user, i.e., separate from machining apparatus.

As described above, the first portion 12 of the tool assembly 100' (as well the first portion 12 of the tool assembly 100) is a canister that is configured to house electronic controls 23. In certain embodiments with reference to FIG. 4 (showing a cross sectional view of the assembly 100' of FIG. 2 taken along the lines IV-IV), the first portion 12 is configured to further house other components necessary for operation of the assembly 100'. For example, in the case of the assembly 100' being a marking tool which utilizes ink, an ink source can be additionally housed by the first portion 12, as well as a power source. In such case (and with continued reference to FIG. 4), the first portion 12 can be defined as an internal web 12a, which divides the areas of the canister into a plurality of separate spaces or compartments, with a first space 12b' sized to accommodate the electronic controls 23, a second space 12b" sized to accommodate the power source, and a third space 12b''' sized to accommodate the ink source. As shown, the spaces 12b" and 12b''', designated for the power and ink sources, are collectively sized to define a majority of the open area of the canister. In certain embodiments, the spaces 12b" and 12b''' are sized so as to define at least 60% of the open area of the canister; perhaps in preferable embodiments, the spaces 12b" and 12b''' are sized to define at least 65% of the open area of the canister; and perhaps in even more preferred embodiments, the spaces 12b" and 12b''' are sized to define at least 70% of the open area of the canister. The manner of maximizing the collective size of the open area of the first portion 12' for the power and ink sources correspondingly maximizes duration by which the tool assembly 100' can be continually used, i.e., without recharging/replacement of the power/ink sources being warranted.

Figure 4:
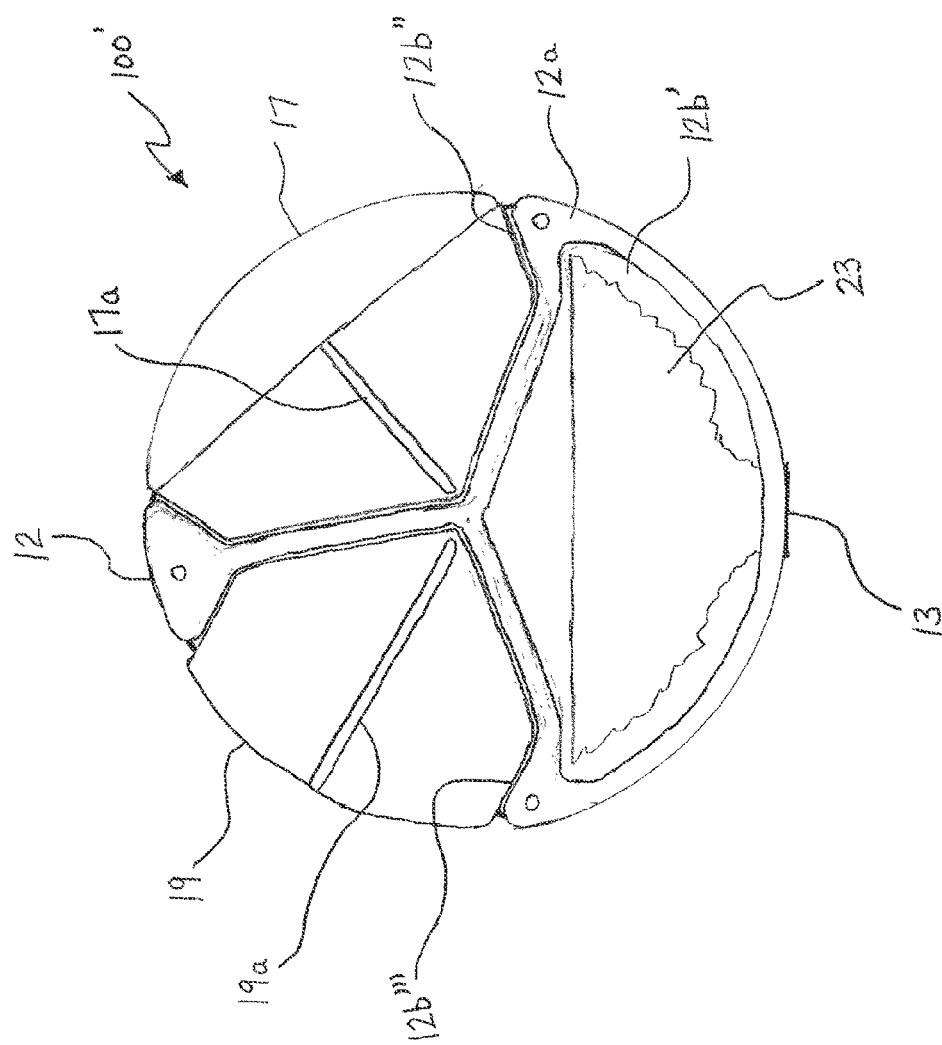
FIG. 4 is a cross-sectional view of the tool assembly of FIG. 3, taken along the lines IV-IV, in accordance with certain embodiments of the invention.

In certain embodiments with continued reference to FIG. 4, the spaces 12b" and 12b''' of the first portion 12 (configured to accommodate the power source and ink source, respectively) are each open to the exterior of the assembly 100', and as such define recesses. In such case, the spaces 12b" and 12b''' can be defined to accept cartridges. To that end, cartridges for both power source (i.e., battery pack 17) and ink (i.e., ink cartridge 19) are shown inserted in the corresponding spaces 12b" and 12b'''. In certain embodiments as illustrated, the battery pack 17 and ink cartridge 19 are shaped to conform to the general shape of the first portion 12 of the tool assembly 100'. Thus, in the case of the first portion 12 having a cylindrical shape, the battery pack and ink cartridge 17, 19 can each be wedge-shaped, with the respective recesses 12b", 12b''' of the first portion 12 correspondingly defined. However, the invention should not be so limited. Particularly, the battery pack 17 or ink cartridge 19 can be differing shapes, although they would be designed so as to collectively accommodate as much of the open area of the first portion 12 as possible, while also being able to be readily and rapidly removed from and replaced within the portion 12 as necessary. To that end, the techniques of maximizing space for sources of power and ink in the first portion 12 of the tool assembly 100', and of making both sources readily replaceable (in the form of a battery pack 17 and ink cartridge 19), enhances overall efficiency of the tool assembly 100' during its life.

Figure 5:
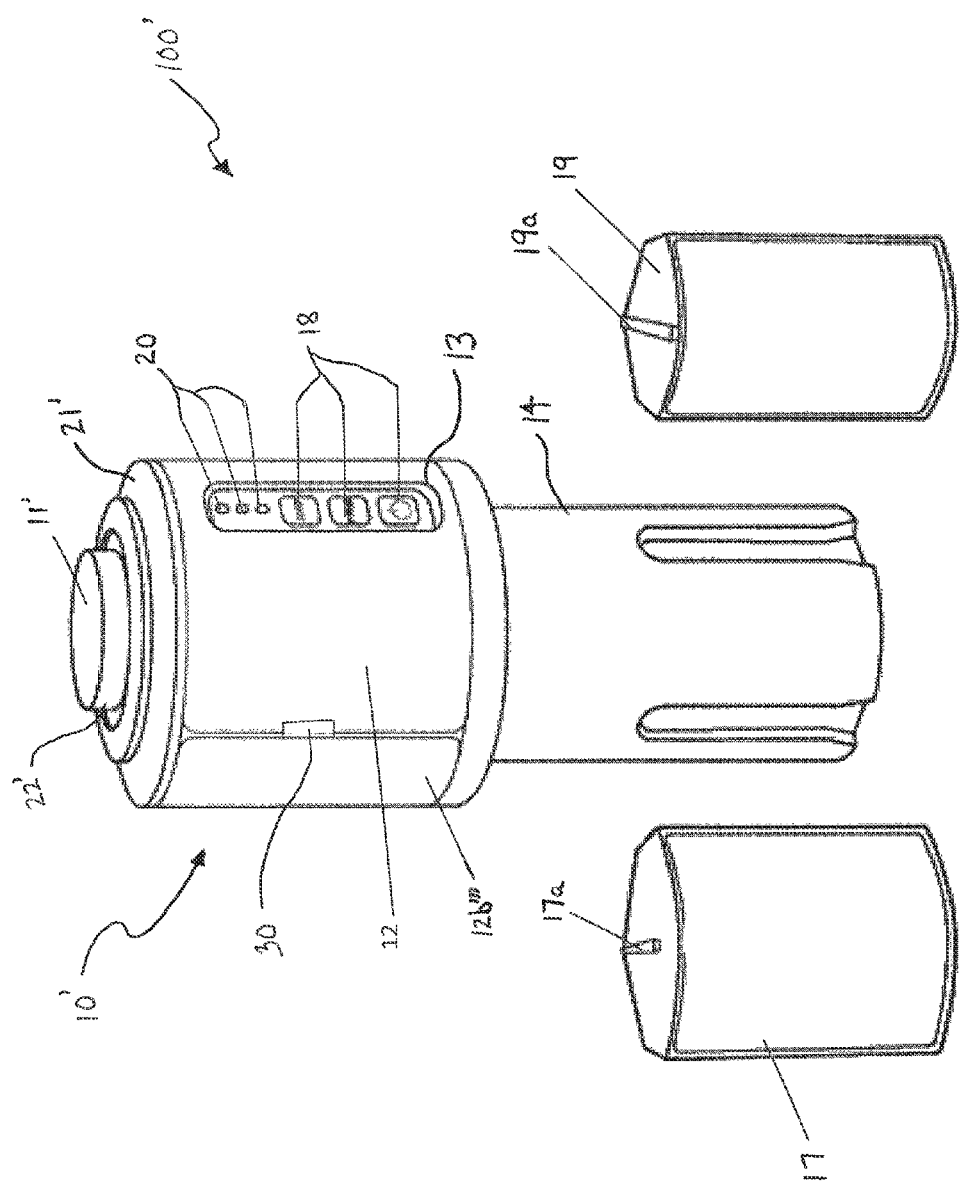
FIG. 5 is another perspective view of the tool assembly of FIG. 2, showing battery pack and ink cartridge removed from a housing of the assembly.
Figure 6:
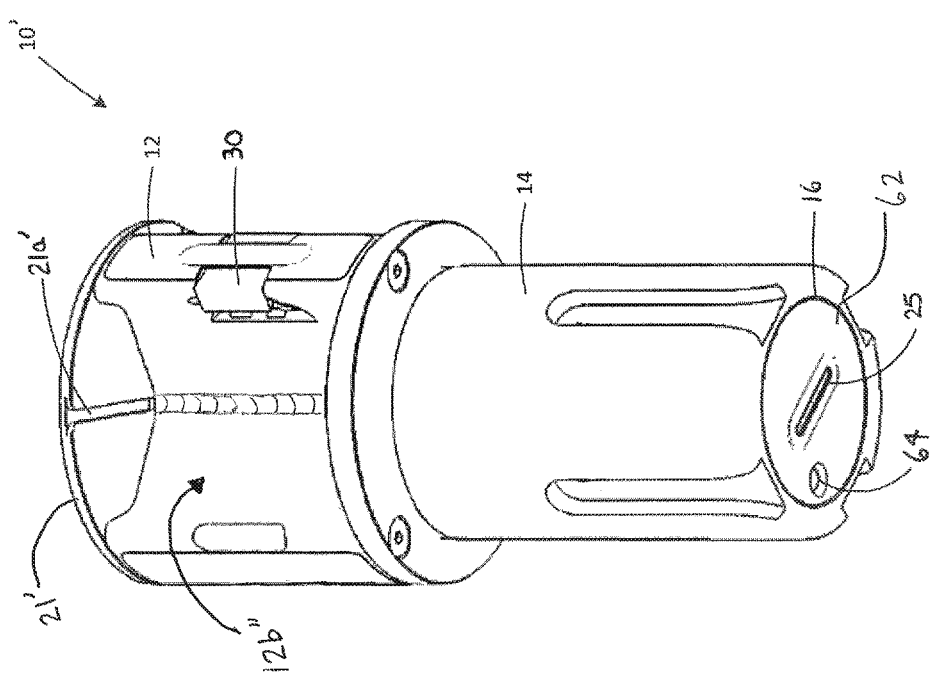
FIG. 6 is a perspective view of the housing of FIG. 5.
Figure 7:
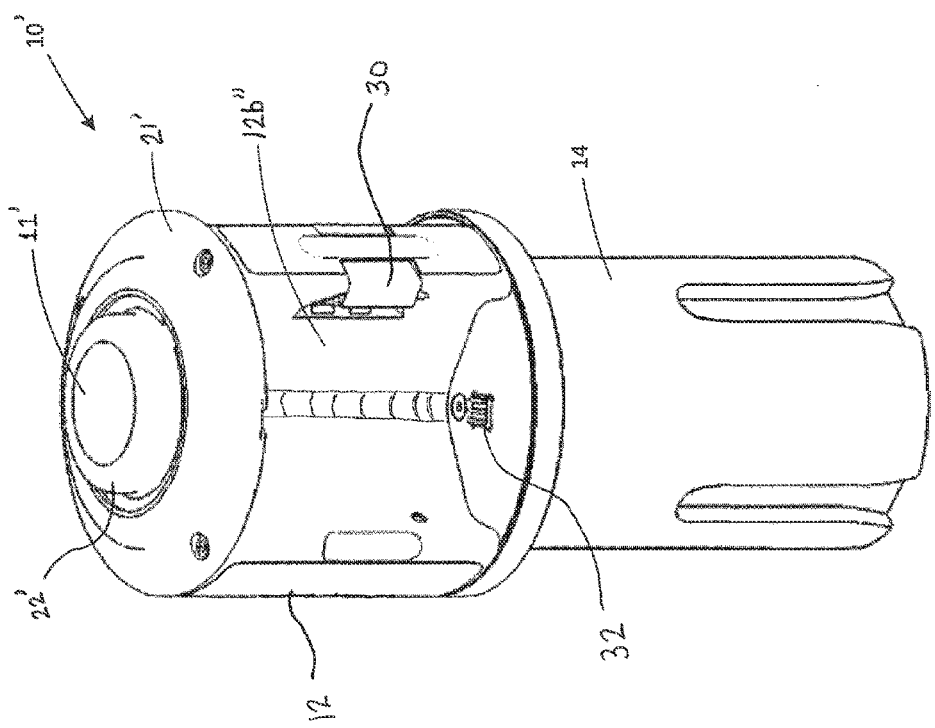
FIG. 7 is another perspective view of the housing of FIG. 5.

FIG. 5 illustrates a further perspective view of the tool assembly 100', configured as a marking tool as described above. As shown, the battery pack 17 and ink cartridge 19 are removed from the first portion 12 of the assembly 100'. In certain embodiments, to ensure proper alignment within the recesses 12b" and 12b''' of the first portion 12, the battery pack 17 and ink cartridge 19 can have mechanisms which mate therewith. For example, as shown in FIG. 5, the battery pack 17 and ink cartridge 19 are configured with protruding strips 17a, 19a on sides (e.g., upper sides) thereof to align with and be slid in corresponding channels 21a' on corresponding side (e.g., underside) of the cover 21' (i.e., one such channel 21a' being shown in FIG. 6). Alternatively, the pack 17 and cartridge 19 may be defined with channels to correspond with protruding strips on underside of the cover 21'. With reference to FIG. 6 (showing another perspective view of the tool assembly 100' of FIG. 2 with battery pack 17 removed therefrom), the battery pack 17 and ink cartridge 19 can be locked within their corresponding recesses 12b" and 12b' via fasteners protruding from the pack 17/cartridge 19 or sides of recesses 12b"/12b'''. For example, in certain embodiments as shown in FIGS. 6 and 7, one or more spring clips 30 are shown as being operably coupled to the sides of the recess 12b" for the battery pack 17. With particular reference to FIGS. 6 and 7, the spring clip 30 can be pushed outward from the recess 12b" when the battery pack 17 is slid therein. Such clip 30 is configured to correspondingly snap back inward of the recess 12b" upon its release. To that end, once the pack 17 is fully inserted and the clip 30 is released, the clip 30 can align and mate with a corresponding slot defined in a corresponding side of the pack 17. While FIGS. 5 and 6 (as well as FIG. 7) show a spring clip 30 on only one side of the recess 12b", it should be understood that a further spring clip 30 can likewise be used on other corresponding side of the recess 12", such that the battery pack 17 (and likewise for the ink cartridge 19) can be secured at each of its opposing sides.

Continuing with FIG. 7 (showing further perspective view of the tool assembly 100', yet from an elevated angle), the recess 12b" configured to accommodate the battery pack 17 shows an exemplary location of electrical terminal 32 for such pack 17 to correspondingly supply power to the electronic controls 23 and in turn, the functional head 25 of the assembly 100'. In certain embodiments, the first portion 12 can further include charging ports (not shown) for charging the battery pack 17. Alternatively, a battery charger is used (separate from the tool assembly 100') for charging the battery. In such cases, when the battery levels are low, the operator may release the spring clip(s) 30 to remove the battery pack 17 from the first portion 12 and charge the battery pack 17 accordingly. As mentioned earlier, indicator lights 20 are provided on user interface 13, and in certain embodiments, one of these lights 20 can be configured for signaling status of battery pack 17 (i.e., having suitable charge, or needing to be charged). For example, such light 20 may display continuously if the pack 17 is suitable for use, and conversely may flash if the pack 17 needs recharging. Alternatively, the light 20 may show different colors for the differing statuses of the battery pack 17. While the battery pack 17 and ink cartridge 19 are shown as being entirely accommodated via their recesses 12b" and 12b''' when loaded in the tool assembly 100', the invention is not limited to such. For example, to further maximize duration of use (prior to being recharged/replaced), the pack 17 and/or cartridge 19 can have enhanced sizes so as to partially protrude from their recesses 12*b*″/12*b*‴; however, this could limit the machining apparatus with which the assembly 100′ can be used.

Figure 12:
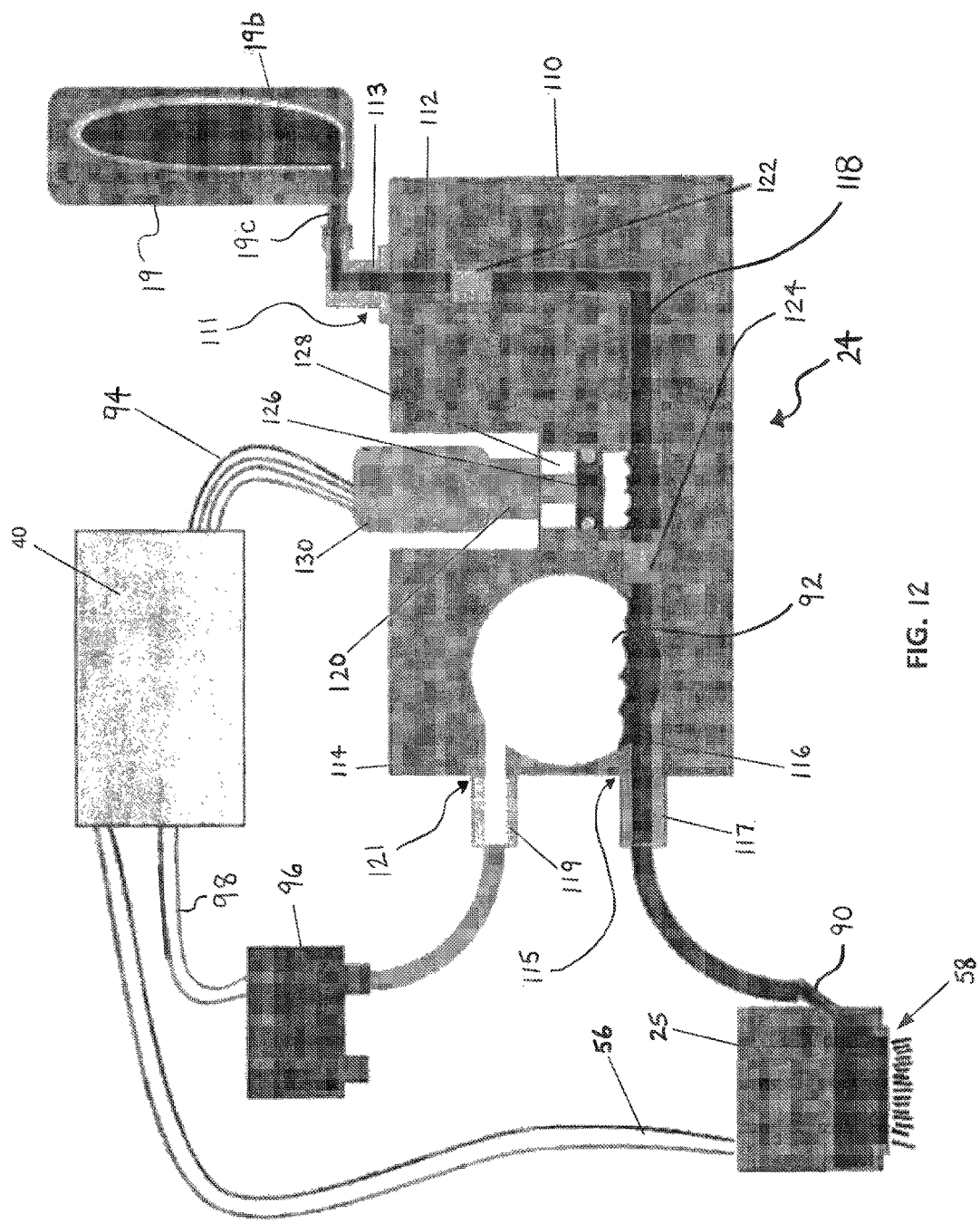
FIG. 12 is a schematic representation of ink flow with regard to function of ink management module for tool assemblies in accordance with certain embodiments of the invention.

Although not illustrated, the ink cartridge 19 serves as a canister for storing a predetermined volume of ink. To that end, the cartridge 19 defines a hollow chamber which houses the ink (e.g., stored in a bag 19*b*, as depicted in FIG. 12). The ink, in certain embodiments, can be a lactate-based ink for producing high-resolution indicia (e.g., 180-200 dots per inch) on non-absorbent surfaces (e.g., metals, plastics, etc.), with such ink having a drying time of about 20 to about 60 seconds. The volume of ink to be accommodated by the ink cartridge 19 can be variable, but as should be appreciated, a majority (and in some cases, a near maximum) of the area defined within the cartridge 19 would be used. Similar to the electrical terminal 32 provided in the recess 12*b*″ for the battery pack 17, the recess 12*b*‴ for the ink cartridge 19 is configured with an outlet bore (not shown, but defined to accept an outlet port 19*c* of the cartridge 19, as shown in FIG. 12) for ink to be pumped from the cartridge 19 (i.e., from the bag therein). The ink is pumped from the ink cartridge 19 to the functional head 25 via actions of the ink management module 24, as will be further detailed herein. Further similar to that described with respect to the battery pack 17, in certain embodiments, one of the indicator lights 20 of the user interface 13 can be configured for signaling status of ink cartridge 19 (i.e., having suitable ink level, or needing to be changed). For example, such light 20 may display continuously if the cartridge 19 is suitable for use, and alternatively may flash if the cartridge 19 needs replacing. Alternatively, the light 20 may show different colors for the differing statuses of the ink cartridge 19.

Figure 9:
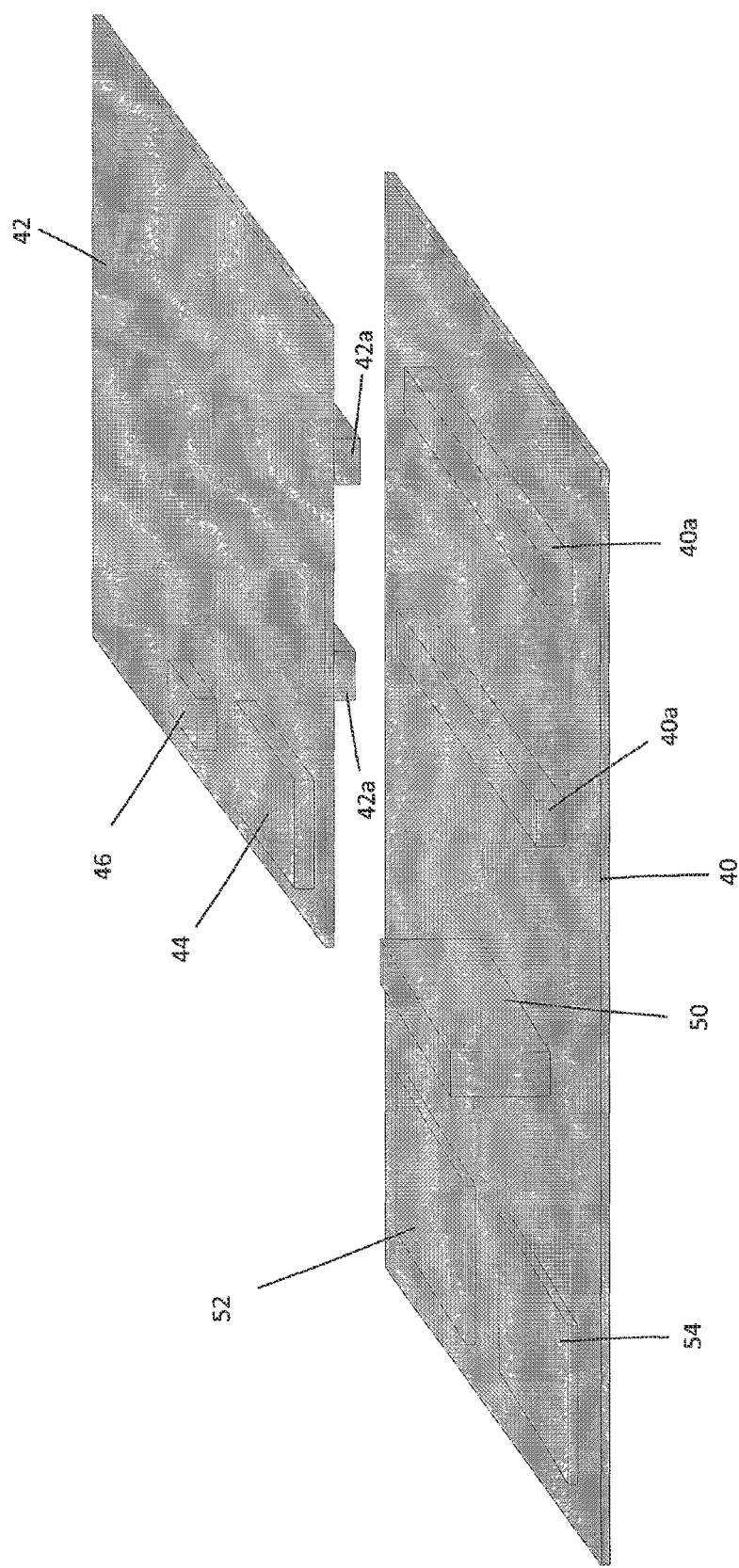
FIG. 9 is a perspective view of exemplary representations of controller and communication boards used within the tool assembly of FIG. 2 in accordance with certain embodiments of the invention.

As already described above (and perhaps as best depicted with reference to FIG. 8), the first portion 12 of the tool assembly 100′ of FIG. 2 is configured to house electronic controls 23, including a controller board 40, including a processing unit, such as a microprocessor. While being housed within the first portion 12, the controller board 40 is configured to communicate with a communication module (exemplary illustrated as its own independent circuit board). For consistency but without limiting effect, the communication module is further referenced herein as the communication board 42. With reference to FIG. 9 (showing a perspective view of representations of the controller and communication boards 40, 42), the boards 40, 42 can take the form of printed circuit boards configured, among other uses, to provide operations for the tool assembly 100′ and help facilitate transmission of operation information to and from the controller board 40, respectively. To that end, the communication board 42 is not only configured to electrically communicate with the controller board 40, but, in certain embodiments, is also operably coupled to the board 40 (e.g., via joining of connectors 40*a*, 42*a*) to form mechanical support (and in some cases, electrical pathways) between the boards 40, 42.

While FIG. 9 shows general sizes and configurations of the boards 40, 42 and coupling mechanisms there between, these details are exemplary and the invention should not be limited to such. To that end, the boards 40, 42 may include further electrical components that, while not shown in FIG. 9, are referenced herein with regard to functionality of the boards 40, 42. In certain embodiments, the communication board 42 can include a wireless communication module 44 for receiving (e.g., printing instructions) and transmitting (e.g., status and/or errors of printing operations) information (in the form of electrical signals) via wireless networking protocols (e.g., IEEE 802.11, 3G, 4G standards). To that end, printing operations can be communicated remote from the tool assembly 100′ (e.g., from computing device of operator). Additionally, in certain embodiments, the communication board 42 can include one or more adapters (e.g., Ethernet ports) 46 to facilitate wired receipt/transmission of information (e.g., involving printing operations) from/to a computing device. The computing device, while not shown, can range from a desktop or a laptop computer to a mobile device, such as tablet or smartphone. While also not illustrated, in certain embodiments, the communication board 42 may be paired with a wireless router to selectively or automatically designate a wireless network by a network identifier (e.g., IP address or node). Once the communication board 42 is connected via network cable or wirelessly with the router, an operator (via computing device) can communicate with the board 42, whereupon such information is in turn communicated to the controller board 40 for desired operations for the assembly 100′. In certain embodiments, the communication board 42 further includes an antenna (not shown), which can be used in extending the range of wireless communication between the communications board 42 and remote computing device.

The user interface 13 of the tool assembly 100′ enables direct communications to take place between the controller board 40 and an operator. To that end, in certain embodiments, the push buttons 18 on the interface 13 are in electrical communication with the controller board 40 via a ribbon cable 48 (partially shown in FIG. 8). As should be appreciated, the ribbon cable 48 includes a plurality of electrical leads extending along its extent, with one end of the cable 48 interfacing with the controller board 40 (e.g., via connector 50, shown in FIGS. 8 and 9) and the other end (not shown) interfacing with the push buttons 18 and indicator lights 20 at the user interface 13. For example, when an operator depresses one of the buttons 18 on the front surface of the interface 13, the controller board 40 receives a corresponding signal (via the ribbon cable 48). As already described (and perhaps better shown with reference to FIG. 3), one of the buttons 18 can be designated for powering the tool assembly 100′. In certain embodiments, upon the operator pressing such button 18, a signal correspondingly transmitted to the controller board 40 triggers a boot-up operation to be performed, which can involve the controller board 40 receiving power from the battery pack 17, an operating system being initialized, and/or the wireless adaptor 44 of the communications board 42 being actuated to receive or transmit signals. Similarly, a variety of other operations such as starting, stopping, or changing configurations of the tool assembly 100′ (e.g., for performing one or more printing operations) can be triggered by actuating one or more of the buttons 18. To that end, in certain embodiments, the buttons 18 may need to be actuated in a predetermined sequence to enable the tool assembly 100′ to perform one or more of the operations. As alluded to above, the ribbon cable 48 includes separate leads for interfacing with the light indicators 20 of the user interface 13. To that end, upon the tool assembly 100′ being powered, the controller board 40 would send signals (via the ribbon cable 48) to illuminate the indicators 20 to correspondingly display various conditions regarding the assembly 100′, such as battery life and/or ink levels (e.g., via flashing or continuously illuminated lights and/or different colors being illuminated).

As should be appreciated, the controller board 40 can perform a variety of operations. For example, in the case of the tool assembly 100′ being a marking tool that utilizes ink, the board 40 is configured to control the ink management module 24 of the tool assembly 100'. To that end, and as shown in FIG. 9, the controller board 40 can include a processing unit (e.g., microprocessor) 52 and on-board memory 54. While the processing unit 52 and on-board memory 54 are separately shown, this was done more for clarity for the reader. Accordingly, it should be understood that both the processing unit 52 and on-board memory 54 could be provided via a single microprocessor, e.g., unit 52. Furthermore, while controller board 40 is mentioned herein with regard to various functions of the tool assembly 100', it should be appreciated that the processing unit 52 (e.g., microprocessor) would be controlling such functions. An operating system can be stored on the on-board memory 54, which enables the controller board 40 to interface with the operator, e.g., via user interface software run on a remote computing device. As such, the operator may send commands to the controller board 40 (via the communications board 42) with respect to printing jobs, to query the board 40 regarding status of a print job, to troubleshoot or update the operating system, etc. To store print jobs or other commands relating to a series of operations (e.g., batch printing), the on-board memory 54 of the board 40 can further be used. The on-board memory 54, in certain embodiments, can also be configured to store settings for the print operations, such as speed of travel of the workpiece 2 and/or tool assembly 100', speed of printing, the requisite distance between the workpiece 2 and the tool assembly 100', etc. As previously described with reference to FIGS. 8 and 9, the controller board 40 is configured to receive information via the communications board 42. This can be via interconnecting pin connectors, cables, and/or wireless connection. To that end, in certain embodiments as shown in FIG. 9, the communications board 42 is provided separate to (yet mechanically mounted near) the controller board 40 in order to house the majority of the electronic controls 23 within the first portion 12 of the tool assembly 100'. However, the components of the communication board 42 may alternatively be adapted onto the controller board 40, thereby eliminating a separate board for housing communication ports or adapters.

As described herein, the tool assembly 100' (as well as the tool assembly 100 of FIG. 1) involves a marking tool, which incorporates an active tool. As further described, in certain embodiments, the operating function of the tool assembly 100' is printing, wherein the printing is performed via the functional head 25 (e.g., printer head or cartridge), which is supplied ink as warranted from ink source contained within the first portion 12 of the assemblies 100. The ink source can take the form of a removable cartridge 19 and the amount of ink fed to the functional head 25 can be regulated via the ink management module 24, which can be contained in the second portion 14 of the assembly 100' and is controlled via commands from the controller board 40.

FIG. 10 is a flowchart 66 showing steps for one method of a printing operation performed by the tool assembly 100' in accordance with certain embodiments of the invention. For a typical printing operation, the operator would generally select content of the indicia to be printed, as well as designate other print parameters, such as font size, type, spacing, etc. In certain embodiments, these variables (regarding the indicia to be printed) can be established by the operator using corresponding software program on a computing device. To that end, upon the content and variables for the indicia being set, the tool assembly 100' is powered in step 68, and the operator (e.g., using same software program or further program) communicates (wirelessly or via direct connection) such information to the communications board 42, such that the information can be received by the controller board 40 in step 70. As described above, to perform the printing operation, the tool assembly 100' is required to be in 'ready' mode (i.e., by forcing surface 11' downward, as already described) and the functional head 25 (e.g., printer head) must be located within pre-set proximity of the workpiece intended to be marked. Once these conditions have been met in step 72, the controller board 40 triggers the functional head 25 to perform the operation in step 74. Before or while the printing operation in performed in step 76, the head 25 will pull ink as needed from the ink management module 24. In addition, during the operation, the module 24 may need to be replenished with ink from the ink cartridge 19. The structure and functionality of this module 24 will be later detailed herein and further described with reference to flowchart 148 of FIG. 16. However, referring back to the flowchart 70 of FIG. 10, following completion of the printing operation, the controller board 40 stops triggering the head 25 in step 78. While not shown, a further optional step may involve the board 40 transmitting a signal (e.g., wirelessly or via direct connection) back to operator's computing device (via the communications board 42) to confirm the printing operation has been completed.

With reference back to FIG. 8, as described above, the second portion 14 of the tool assembly 100' houses the functional head 25. As already noted, in the case of the tool assembly 100' being a marking tool that utilizes ink, the functional head 25 can involve a printer head or cartridge. As further described, the functional head 25 is electrically connected to the controller board 40, e.g., via one or more ribbon cables 56, such that printing instructions can be passed from the board 40 to the head 25. In the case of being a printer head, the functional head 25, in certain embodiments, can include a plurality of nozzles 58 disposed on a bottom surface thereof. The bottom surface of the print head, in certain embodiments, can align with a slot 60 in a nozzle plate 62 for delivering ink on to the workpiece. The size and spacing of the nozzles 58 can be configured as warranted to achieve desired printing speeds and/or print resolution. For instance, an exemplary configuration for the nozzles 58 may result in the printing speed being about 300 inches per minute, with the print resolution being about 200 dots per inch in the horizontal direction and about 185 dots per inch in the vertical direction. To that end, it should be appreciated that variances in printing speeds and/or resolutions can be achieved via corresponding changes to size and spacing of the nozzles 58 in the nozzle plate 62.

As alluded to above, upon triggering the tool assembly 100' to be in 'ready' mode (via downward force being exerted on surface 11'), the assembly 100' is disposed to begin a printing operation, provided the tool is positioned within a predetermined distance from the workpiece. To that end, and as shown in FIGS. 6 and 8, the tool assembly 100' can include at least one proximity sensor 64 (e.g., recessed into nozzle plate 62, further detailed below, whereby a glass lens can be added in front of it, and perhaps aligned with outer surface of nozzle plate 62, so as to protect the sensor 64 from damage). As should be appreciated, the sensor 64 continuously monitors the distance between the nozzle plate 62 and a workpiece, and sends a signal to the controller board 40 when the measured distance is less than or equal to a predetermined distance (e.g., 1 inch, 0.5 inches, 0.25 inches, 0.125 inches, or other select distance) warranted for the printing operation. Upon meeting this condition, the printer head (as functional head 25') is correspondingly triggered by the controller board 40 to begin expelling ink from its nozzles 58 for printing indicia on the workpiece. In certain embodiments, the predetermined distance can be programmed and/or stored in the controller board 40. In such case, when the distance measured by the proximity sensor 64 is greater than or equal to the predetermined distance, the controller board 40 would correspondingly halt the printing operation. However, when the bottom surface of the second portion 14 and the nozzle plate 62 coupled thereto are again positioned less than the predetermined distance from the workpiece (e.g., by further ram stroke of a punch press, by manually bringing the tool assembly 100' toward the workpiece, or by other means of moving the assembly 100' toward the workpiece), the printing operation would again be triggered by the controller board 40.

Figure 11A:
FIGS. 11A and 11B are schematics showing lines of printed indicia using tool assemblies in accordance with certain embodiments of the invention.
Figure 11B:
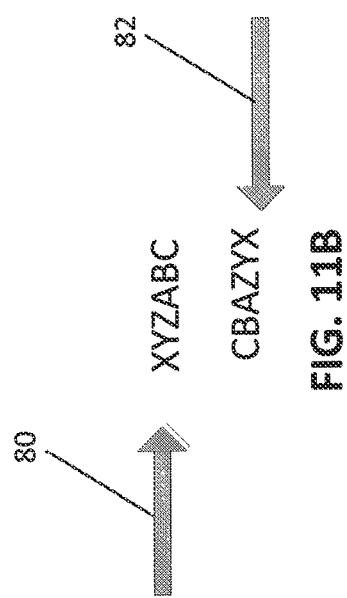

As should be appreciated, when performing its operation, the tool assembly 100' is typically held stationary, while the workpiece translates relative to the assembly 100' with certain speed of travel. However, the tool assembly 100' may alternatively be used to translate with certain speed of travel about a stationary workpiece. For either case, the tool assembly 100', in certain embodiments, can be configured with corresponding sensor means for measuring direction and/or speed of travel with regard to the workpiece. For example, the tool assembly 100' may be equipped with one or more of an accelerometer, a trackball, a distance and/or position sensor, and optical sensors or encoders. Such devices are well known in the art, one of which can be selected and further located on the nozzle plate 62, e.g., perhaps adjacent the proximity sensor 64, to measure one or more of speed, direction of travel, or position of the workpiece and/or the tool assembly 100'. Once measured, the data can be sent to the controller board 40. In certain embodiments, the data may further be transmitted to an operator (via communication board 42). In monitoring the speed of travel of the workpiece and/or tool assembly 100', the controller board 40 can correspondingly modify the printing speed and direction of printing as needed. To that end, such capability can also enable the tool assembly 100' to print in a forward and backward direction. Particularly, as illustrated in FIG. 11A, when the workpiece and/or the tool assembly 100' is moving in a first direction 80, the printer head (as functional head 25) may be driven to print indicia in a first sequence (e.g., XYZABC). The tool assembly 100' may then be moved to a next line, whereby its direction of travel is reversed to a second direction 82, whereupon the printer head can be driven to print in a reverse sequence (e.g., CBAZYX), such that lateral inversion of indicia can be avoided. Alternatively, as shown in FIG. 11B, the printer head may be driven to print indicia in the same sequence when the tool assembly 100' is moved in the second direction 82, such a second line of indicia mirrors a first line of indicia. Furthermore, while not shown, it should be understood that the printer head (as functional head 25) can provide various output, such as indicia, images, etc. Thus, in light of the above examples relating to indicia yet looking at the case of images, if the image to be printed is larger than the printer head, the functional head 25 can be controlled to print the image in a plurality of segments, e.g., wherein each segment may represent a different printing operation, that are performed in sequence (and whereby the segments can be thought of as differing portions of the whole that are effectively stitched together after the printing operations are completed).

As described above, and with reference back to FIG. 8, an intermediary element provided for passage of ink through the tool assembly 100' is the ink management module 24. To that end, FIG. 12 illustrates a representative diagram of ink flow from ink cartridge 19 to functional head 25 in accordance with certain embodiments of the invention. Starting with the functional head 25 (e.g., printer head), it is shown to have an ink port 90 (e.g., at a side surface thereof) for receiving ink from the ink management module 24. The ink port 90 can be fluidly coupled (e.g., via tubes, hoses, fluid fasteners and/or adapters) with an ink reservoir 92 of the module 24. In certain embodiments, at least a portion of the printer head may be made of a piezoelectric material. In such embodiments, the printer head can be electrically actuated (e.g., by voltage applied from the controller board 40), thereby generating sufficient pressure to force ink from printer head and be subsequently expelled out of the nozzles 58 and on the workpiece, and thereby generating a vacuum for ink to be drawn from the ink reservoir 92. Once print operation is complete, the printer head is deactivated (e.g., by removing the voltage). As will be explained below, the level of ink in the ink reservoir 92 is monitored as the printer head dispenses ink to the workpiece, such that further ink can be drawn from the ink cartridge 19 to replenish the prior level of ink in the reservoir 92 as needed.

Figure 14:
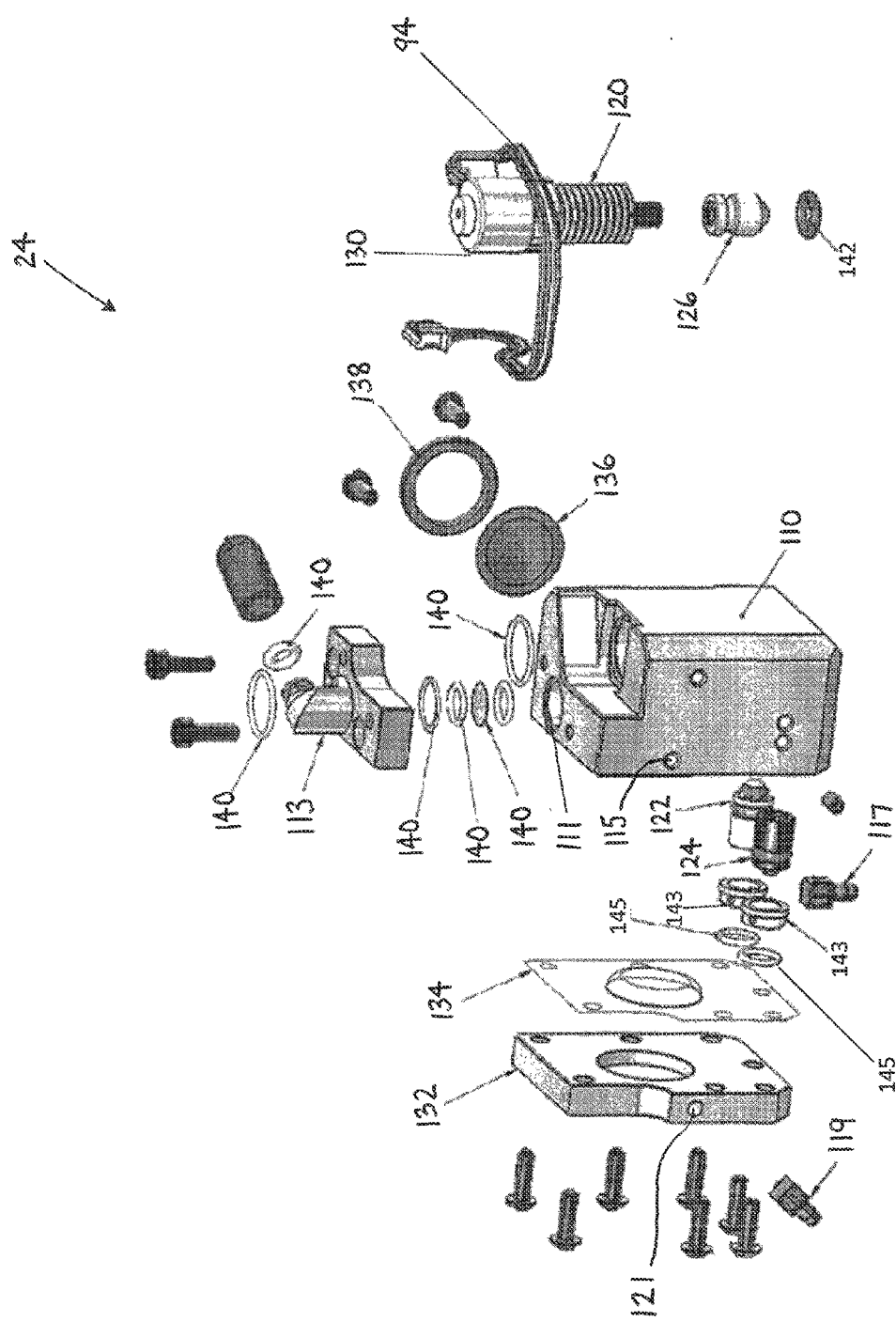
FIG. 14 is an exploded perspective view of the one physical version of the ink management module of FIG. 12, taken from vantage point shown in FIG. 13C in accordance with certain embodiments of the invention.
Figure 15:
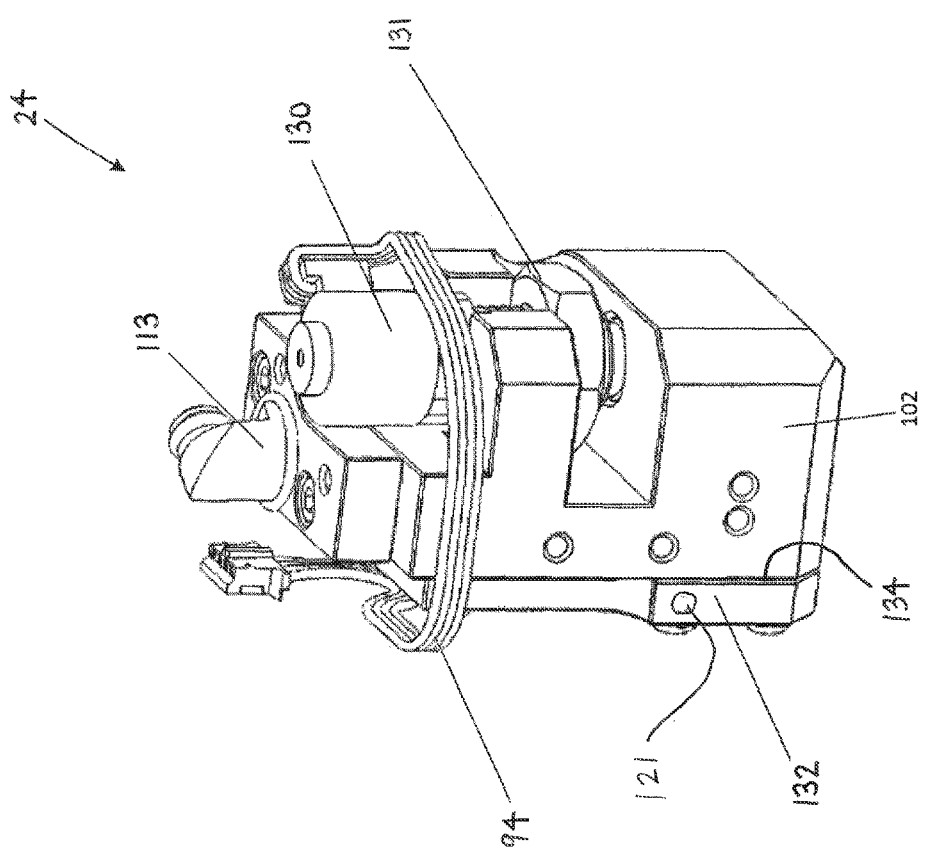
FIG. 15 is a perspective view of portion of the one physical version of the ink management module of FIG. 12, taken from vantage point shown in FIG. 13C in accordance with certain embodiments of the invention.

As described above (and shown in FIG. 12), the ink management module 24 is controlled by the controller board 40 (i.e., via wire ribbon 94), thereby facilitating delivery of ink from the ink cartridge 19 to the ink reservoir 92 as warranted. FIGS. 13-15 show various views of one version of the ink management module 24 in accordance with certain embodiments of the invention; however, FIG. 12 is initially referenced in describing the general functioning of the module 24 and the corresponding components of the tool assembly 100' which aid with the module's functioning. As shown, the ink management module 24 is configured in the form of a manifold 110. The manifold 110 has at least two fluid lines 112 and 116 defined therein, for enabling passage of ink from the ink cartridge 19 (and bag 19b holding ink therein) to the functional head 25. To that end, the manifold 110 has an inlet 111, with corresponding inlet port 113, which communicates with fluid line 112, and an outlet 115, with corresponding outlet port 117, which communicates with fluid line 116.

With continued reference to FIG. 12, the inlet port 113 is in fluid communication with the ink cartridge 19 (e.g., via hose and/or adapters positioned there between), through which ink from the cartridge 19 can be supplied to the ink reservoir 92, as will be described below. To that end, as already explained herein, such communication path is fashioned via use of an outlet bore, defined in the recess 12b''' of the first portion 12 of the tool assembly 100' and sized to accept outlet port 19c of the ink cartridge 19. Likewise, the outlet port 117 is in fluid communication with the functional head 25 (e.g., via hose and/or adaptors), whereby ink from the ink reservoir 92 is supplied to the head, as warranted. As further shown, another outlet 121 is provided, equipped with further port 119 and which further stems from the ink reservoir 92 via fluid line 114. The further port 119 is coupled (e.g., via tubes, hoses and/or fasteners) to a pressure sensor 96 for measuring the level of vacuum inside the reservoir 92. Specifics regarding the sensor 96 will be later detailed.

Further looking to FIG. 12, the manifold 110 is shown to include an actuator 120. The actuator 120 is oriented between the inlet 111 and outlet 115 (and their corresponding fluid lines 112 and 116), and is configured to function with a first valve 122 (e.g., check valve facilitating unidirectional flow therethrough) positioned upstream of the actuator 120 and a second value 124 (e.g., a further check valve) positioned downstream of the actuator 120 (yet upstream of the ink reservoir 92). The actuator 120 is configured to trigger movement of a piston 126 within a chamber 128 that intersects a further fluid line 118 of the manifold 110. As shown, the further fluid line 118 extends between the first and second valves 122, 124, and thereby bridges the inlet fluid line 112 and the outlet fluid line 116.

Regarding flow of ink from ink cartridge 19 to functional head 25 (e.g., printer head), upon a retraction stroke of the actuator 120 (whereby the piston 126 is pulled toward the actuator 120), corresponding suction force created in the chamber 128 causes ink to be pulled from the cartridge 19 and through the first value 122, while being blocked at the second value 124. Conversely, upon a subsequent delivery stroke of the actuator 120 (whereby the piston 126 is pushed away from the actuator 120), the corresponding pressure created in the chamber 128 causes the previously pulled-in ink (which is stopped from passing back into ink cartridge 19 via first value 122) to be pushed through the second value 124 and into the ink reservoir 92.

As previously described, the actuator 120 is electrically connected (e.g., via ribbon cable 94) to the controller board 40, whereby the board 40 controls/regulates the amount of ink supplied to the ink reservoir 92 as is needed for the functional head 25 (e.g., printer head). To that end, the ink management module 24 is configured to receive signals from the board 40 to trigger the actuator 120. The actuator 120, in certain embodiments, can be a linear actuator configured for moving the piston 126 in incremental steps within the chamber 128. In such case, and via a stepper motor 130 electrically connected to the controller board 40 (e.g., via ribbon cable 94), the board 40 can trigger the actuator 120 to move the piston 126 in select directions and distances within the chamber 128. Although the illustrated embodiment shows the actuator 120 to be vertically-oriented, the invention should not be limited to such. Instead, the actuator 120 can be oriented in any axis, whereby the piston 126 is correspondingly oriented to move in opposing directions within the chamber 128 along such axis. As previously described, the printer head (as functional head 25) can be piezo-electrically actuable, such that when triggered by the controller board 40, the printer head can generate sufficient pressure to force ink from ink reservoir 92 and out of its nozzles 58 so as to be deposited on the workpiece. Once print operation is complete, the printer head is deactivated (e.g., by removing the voltage from board 40); however, during the operation, the actuator 120 can be triggered by the board 40 to supply more ink to the ink reservoir 92 when needed, as will be detailed below.

Figure 16:
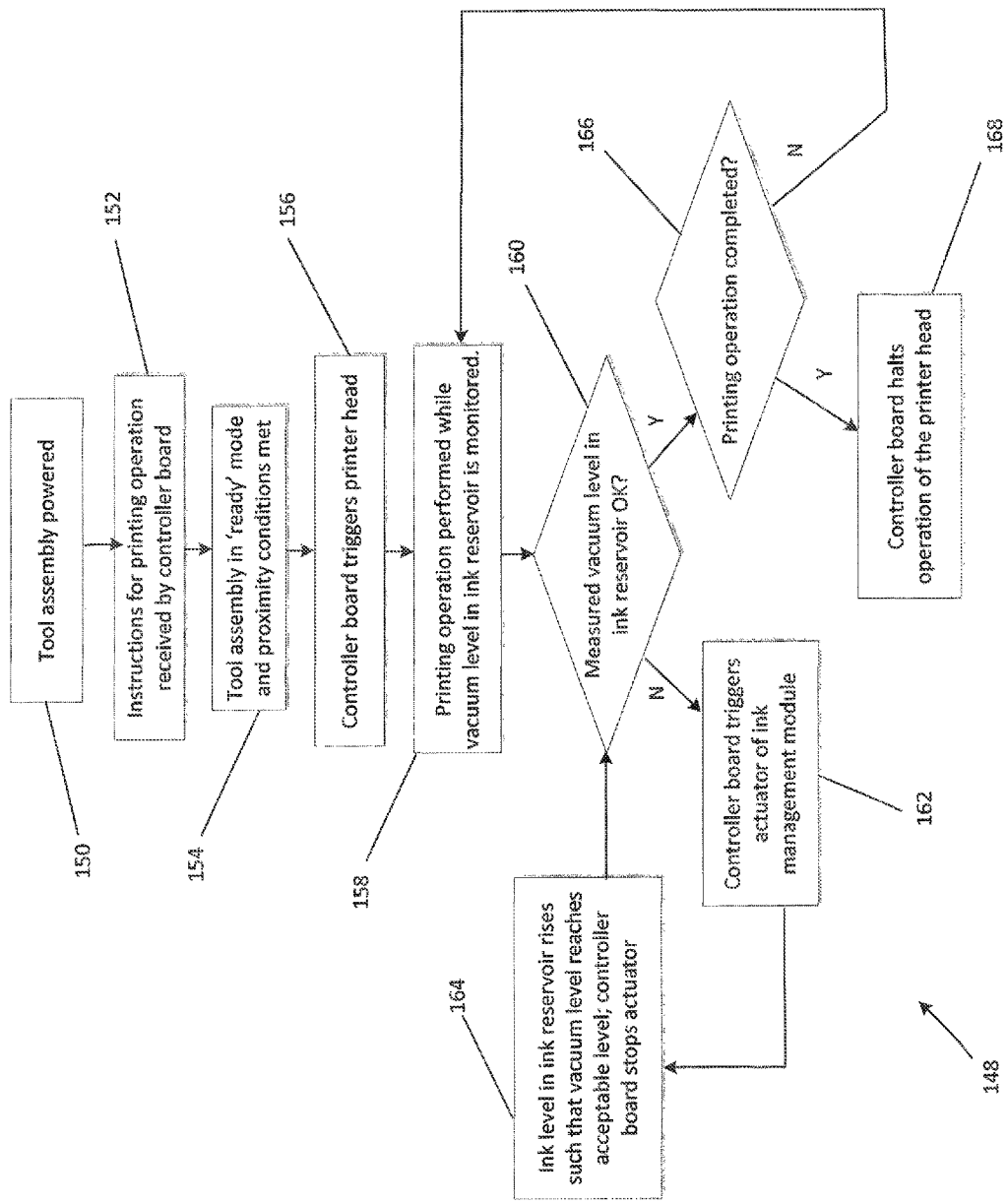
FIG. 16 is a flowchart showing steps for a method of printing indicia while replenishing ink as needed with tool assemblies in accordance with certain embodiments of the invention.

FIG. 16 is a flowchart 148 showing steps for a further method of a printing operation performed by the tool assembly 100' in accordance with certain embodiments of the invention. As will be described below, the method is similar in certain respects to the method described with reference to FIG. 10; however, this method further shows steps taken in monitoring and replenishing the ink level supply within the ink management module 24, if needed. As alluded to above, the first four steps (steps 150, 152, 154, and 156) of the flowchart 148 are similar to those already described for the flowchart 66 of FIG. 10. Particularly, the tool assembly 100' is powered in step 150; the information regarding the printing operation is received by the controller board 40 in step 152; the tool assembly 100' is actuated to be in 'ready' mode and the functional head 25 (e.g., printer head) is positioned within required proximity of the item (e.g., workpiece) to be marked in step 154; and the functional head 25 is triggered by the controller board 40 in step 156 to perform the printing operation. At this point, with reference to FIG. 12, the ink reservoir 92 holds a first volume of ink and a volume of air above the ink. As the ink reservoir 92 is sealed to form an air-tight seal (as will be later described), the volume of air in the ink reservoir 92 is fixed.

With continued reference to FIGS. 12 and 16, as the functional head 25 (e.g., printer head) begins to expel ink during operation in step 158, further ink is supplied to the head 25 from the ink reservoir 92. However, as a consequence of the ink emptying from the reservoir 92 (and due to the volume of the reservoir 92 being fixed), a corresponding decrease in air pressure within the reservoir 92 results. In certain embodiments, the air pressure in the ink reservoir 92 drops below atmospheric pressure to create a vacuum in the reservoir 92. To that end, simultaneous with the printing operation in step 158, the air pressure in the reservoir 92 is monitored by the pressure sensor 96 interconnected to port 119. Pressure sensors are well known in the art. To that end, the sensor 96 can generally involve any commercially-available sensor. With continued reference to FIGS. 12 and 16, the pressure sensor 96 is electrically coupled (e.g., via electrical leads 98) to controller board 40, such that the sensed pressure can be checked against an acceptable level (or range) in step 160.

If the sensed pressure is at an acceptable level, the printing operation continues until completed in step 166. Upon completion of the printing operation, the controller board 40 stops triggering the head 25 in step 168. While not shown, a further optional step may involve the board 40 transmitting a signal (e.g., wirelessly or via direct connection) back to operator to confirm the printing operation has been completed. On the other hand, if the printing operation is not completed (and for as long as the printing operation continues), the air pressure in the reservoir 92 correspondingly continues to be monitored by the sensor 96, as seen by the flowchart looping back to step 158.

Staying with FIG. 16, if, on the other hand, the sensed pressure is found to be at unacceptable level (or outside acceptable range) in step 160, the controller board engages the ink management module 24 in step 162. Particularly, the actuator 120 is triggered to replenish ink within the ink reservoir 92, and, in doing so, raise the pressure level within the reservoir 92 to acceptable level or range. The process by which triggering the actuator 120 to further supply ink from the ink cartridge 19 to the ink reservoir 92 has already been described. As should be appreciated, as the ink level rises in the reservoir 92 due to activity of the actuator 120, the air pressure in the ink reservoir 92 correspondingly rises. Such activity continues (i.e., the controller board 40 continues to trigger the actuator 120) until acceptable pressure level is reached in the reservoir 92 in step 164, which in turn results in the board 40 deactivating the actuator 120 to stop further supply of ink from the cartridge 19 to the reservoir 120. However, as described above, the process of monitoring the pressure level within the reservoir 92 continues (as reflected by step 164 looping back to step 158) until the printing operation is completed in step 166.

As noted above, FIGS. 13-15 show different views of an exemplary version of the ink management module 24 in accordance with certain embodiments of the invention. To that end, certain components already described with respect to the module 24 are labeled, in addition to other components now detailed. With reference to FIGS. 13A, 13B, and 13C (and with further reference to FIG. 14, showing an exploded view from the vantage point of FIG. 13C), The module 24 is configured to be oriented such that the inlet port 113 (in communication with the ink cartridge 119; not shown) protrudes from a top surface, while the outlet port 117 D (in communication with the functional head 25; further not shown) protrudes from a side surface. From FIGS. 13A-D, as well as FIGS. 14 and 15, one can appreciate the physicality of the module 24, while also better appreciating how the components can be assembled together. For example, with reference to FIG. 13D, the first and second valves 122, 124 are shown as being located at a bottom surface of the module 24 and are proximate to the piston 126. To that end, in certain embodiments as shown, the valves 122, 124 can be recessed into the manifold 110. Further, the actuator 120 can be fastened to the manifold 110 by a fastener 131 (blocked from view in FIGS. 13 and 14, but shown in FIG. 15). Newly referenced components shown in FIGS. 13A-D relate to areas of the ink management module 24 that undergo significant changes in pressure during its operation. For example, relating to the air reservoir 92 and pressure sensor 96 in communication therewith, a side plate 132 is shown operatively coupled to the manifold 110 (e.g., via fasteners) and sealing membrane 134 used therewith. Further relating to the piston chamber 128, a membrane seal 136 can be used. These features will be further described below.

As should be appreciated, in certain cases, the tool assembly 100' can be tipped sideways or rotated by an operator when handling the assembly 100' (e.g., such as when loading or unloading the assembly 100' to a punch press, or when manually operating the assembly 100'). Alternatively, the tool assembly 100' may be stored in a prone orientation when not in use. Due to this, in certain embodiments, as exemplified in FIG. 14, the assembly 100' can be provided with a barrier so as to prevent potential ink flow from the reservoir 92 into the pressure sensor 96, so as to ensure accurate pressure sensing and corresponding triggering of the actuator 120 and operation of the tool assembly 100'. In certain embodiments, such barrier can be provided in the form of sealing membrane 134. In certain embodiments, the membrane 134 can be made of a material having elastic properties, while also being ink-resistant. The sealing membrane 134 is configured to have superior chemical resistance, and not degrade when exposed to ink or other chemicals (e.g., such as solvents used for cleaning the ink management module 24). In certain embodiments, the material for the sealing membrane 134 can include rubber, and synthetic polymers such as polypropylene, Viton, polyisoprene or PTFE. Further, in certain embodiments, the thickness of the membrane 134 is at least 0.001", and perhaps in more preferred embodiments, the thickness of the membrane 134 is in the range between about 0.001" and about 0.015".

With reference back to FIG. 12, and with continued reference to FIG. 14, the further outlet port 119 used for connecting the pressure sensor 96 to the ink reservoir 92 is coupled to the side plate 132 (so as to communicate with outlet 121). In locating the sealing membrane 134 between side plate 132 and manifold 110 (and thus, between pressure sensor 96 and ink reservoir 92), the sealing membrane 134 is sandwiched there between upon the plate 132 being fastened to manifold 110, as already described. As a result, the sensor 96 can be fluidly separated from the reservoir 92. Moreover, during operation of the module 24, when ink is expelled by the functional head 25 (e.g., printer head) to the workpiece and the pressure of air in the ink reservoir 92 decreases, the membrane 134 is configured to flex due to the drop in pressure. However, as the sealing membrane 134 is designed to flex nearly elastically, the vacuum level in the corresponding fluid lines between the sensor 96 and ink reservoir 92 is largely unhindered. In other words, the membrane 134 does not alter the vacuum level along the lines up to the sensor 96. This allows the sensor 96 to accurately measure the level of pressure in the ink reservoir 92 even though a barrier exists between the reservoir 92 and sensor 96. Thus, when the membrane barrier 134 is placed between the ink reservoir 92 and the sensor 96, elastic flexing of the sealing membrane 134 does not affect the sensor's operation. Further, the membrane 134 also prevents ink from clogging and/or drying in the vacuum line and/or sensor 96 when the tool assembly 100' is tipped sideways or rotated during loading, unloading or storage.

With continued reference to FIG. 14, certain embodiments of the ink management module 24 can include using membrane seals to maintain the pressures/vacuums created in the module 24, without being affected by the exterior air at atmospheric pressure. As described above, one such membrane seal 136 can be located to form an air- and fluid-tight seal between the piston chamber 128 and the exterior of module 24. In certain embodiments, a spacer ring 138 can be used to facilitate a tight seal about the seal 136 and to account for manufacturing tolerances. In turn, forming an airtight seal prevents air from contacting any residual ink trapped in the piston chamber 128 (or in adjoining fluid line) from evaporating and/or drying. Similar to sealing membrane 134, the membrane seal 136 can be formed of a material having elastic properties, so that when the piston 126 translates in the piston chamber 128 (i.e., when acted on by the actuator 120), the seal 136 deforms elastically inward or outward (e.g., flexing like bellows). This action can prevent pressure buildup in the module 24 as the piston 126 translates in the chamber 128, and simultaneously prevent residual ink in the chamber 128 from evaporating.

It should be appreciated that other miscellaneous seals may be used throughout the assembly of the module 24. Some seals (referenced as 140 in FIG. 14) are generally shown as being used at inlets/outlets to the manifold 110, but are also with fasteners. Other seals are designated to function with particular components. For example, regarding the piston 126, a seal 142 (e.g., such as an O-ring) can be used to form a fluid-and air-tight seal at the distal end of the piston 126. Further, regarding the first and second valves 122, 124, their frictional fits within the manifold 110 (via separate recesses therein) can be ensured via pairs of seals 145 and spacer rings 143. However, the module 24 can be particularly susceptible to air cavitation during the retraction stroke of the piston 126, whereby bubbles are formed in the ink drawn from the ink cartridge 19. Particularly, when the piston 126 is brought toward the actuator 120 to draw ink from the cartridge 19, the pressure in the piston chamber 128 decreases. If the pressure drops below the vapor pressure of the ink, the ink may form bubbles, which may collapse on the piston 128. In attempting to minimize this problem, in certain embodiments, the user interface 13 can include a 'purge' button 118 for purging the tool assembly 100'. For example, in pressing the 'purge' button 118, the controller board 40 can be triggered to cycle the actuator 120, forcing ink and any air through the module 24 to be expelled through the functional head 25 (e.g., printer head). Such function would stabilize conditions for the module 24 prior to the assembly's use. Alternatively, or in addition, each of the seals of the module 24 can be replaced or supplemented with air-tight seals (e.g., automotive seals), e.g., formed of polymer materials such as silicone, fluoro-elastomers, Teflon, tetrafluoro-ethylene propylene, urethane, nitrile, EPDM, etc.

Figure 17:
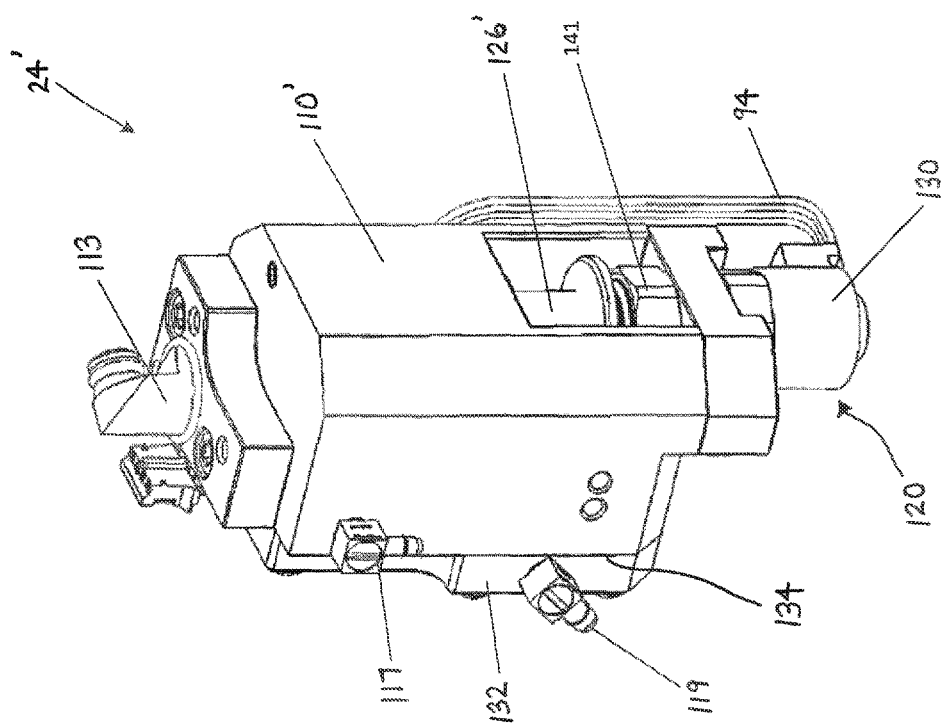
FIG. 17 is a side perspective view of another physical version of the ink management module of FIG. 12 in accordance with certain embodiments of the invention.
Figure 18:
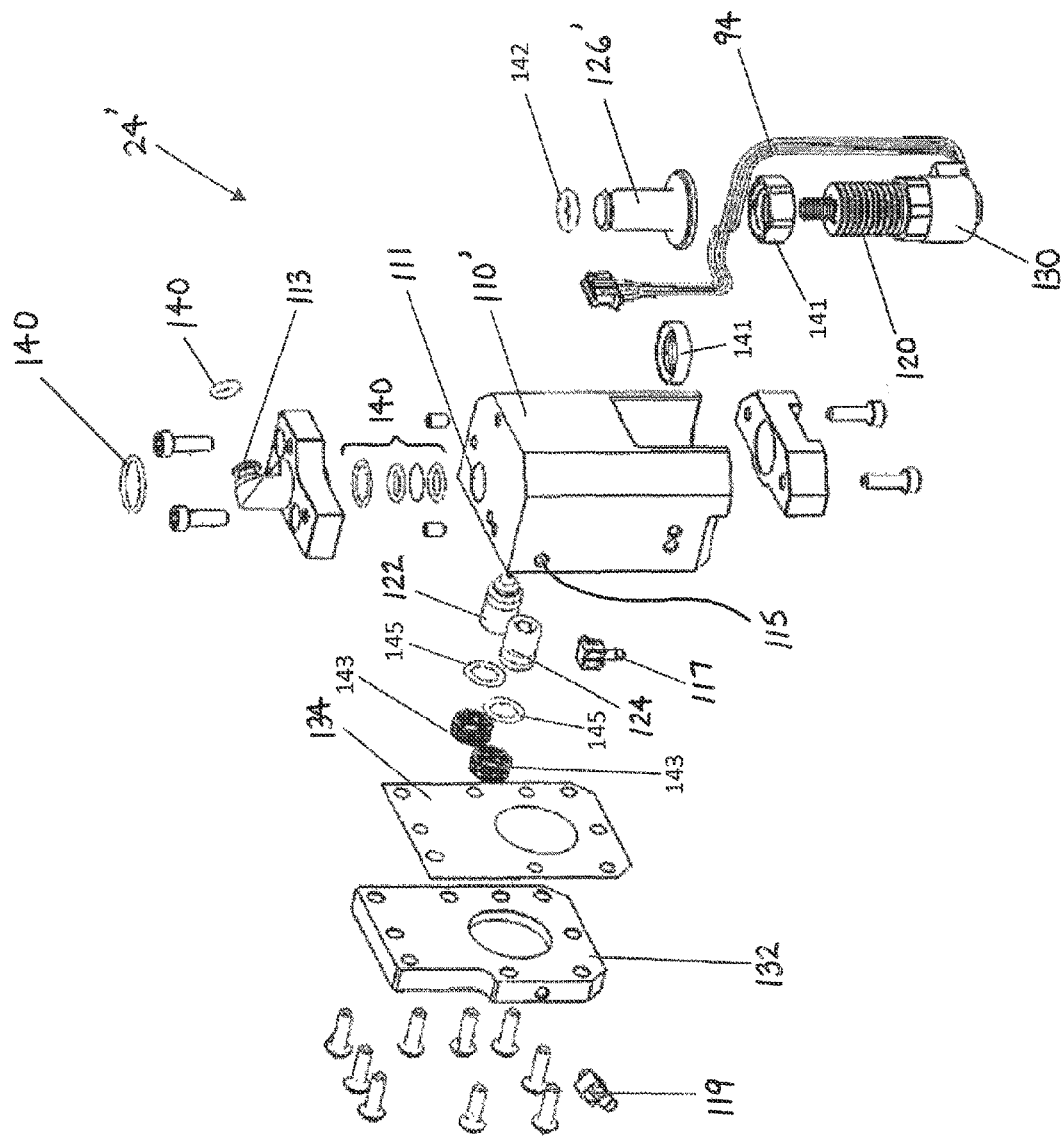
FIG. 18 is an exploded perspective view of the ink management module of FIG. 17 in accordance with certain embodiments of the invention.

Furthermore, and with reference to FIGS. 17 and 18 (showing perspective and exploded views of a further exemplary version of ink management module 24' in accordance with certain embodiments of the invention), certain design changes may be made the ink management module. For example, as shown, the actuator 120 may be positioned in opposite orientation (to that of module 24 in FIGS. 12-15) so that the piston 126' and its chamber (not shown) may be located more proximate to the inlet port 113. To that end, in certain embodiments, the retraction stroke of the actuator 120 can be shortened (in comparison to the retraction stroke of the actuator 120 of module 124). Further to that same end, in certain embodiments, the fluid lines 112, 114, 116, and 118 can be placed more proximate to the inlet port 113. Each of these variations would further enable the pressure drop in the piston chamber to be limited when ink is drawn in from the ink cartridge 19, which would minimize the formation of bubbles in the chamber due to cavitation, or exposure of bubbles to atmospheric pressure.

Figure 19:
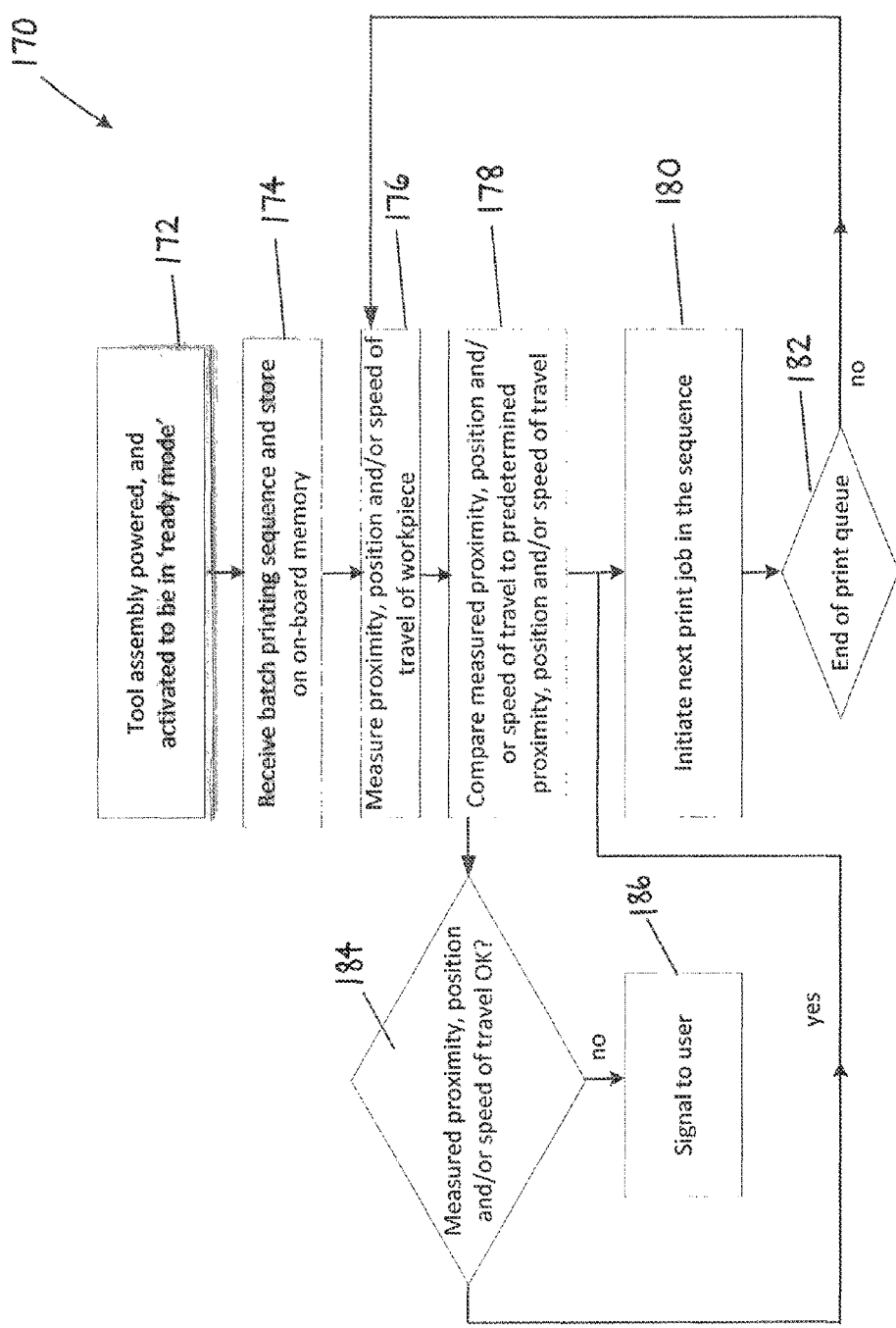
FIG. 19 is a flowchart showing the steps of performing a batch printing operation with tool assemblies in accordance with certain embodiments of the invention.

As should be appreciated, embodiments of the invention are applicable for performing batch (i.e., multiple) operations, now described with reference to flow chart 170 of FIG. 19. As seen in step 172, the tool assembly 100' is powered and activated to be in 'ready mode'. In step 174, a plurality of print jobs may be sent via computing device (as already described herein) and received by the controller board 40. The tool assembly 100' would measure proximity, position and/or speed of travel of the workpiece (as earlier described) in step 176 and compare them to predetermined values for the first printing operation in step 178 once the measured proximity, position and/or speed of travel meet the predetermined values or thresholds. If the measured parameters do not meet the values or thresholds in step 184, the board may send a signal to the operator in step 186 (e.g., via wireless or wired communication via the communication board 42, or wired connection via user interface 13 and one or more of its indicators 20). In the alternative, if each of the measured parameters meets the predetermined values/thresholds in step 184, the first printing operation is performed, e.g., according to flowchart 148 of FIG. 16. Following completion of the first printing operation, the controller board 40 would query its on-board memory 54 to check for a further printing operation in step 180. If further printing operation of sequence is located in step 180, the process loops back to step 176, whereby proximity, position, and/or speed of travel of the workpiece are measured for the further operation before the further printing operation can be performed. Thus, a plurality of printing operations can be performed in a sequence. However, if further printing operation is not located, the end of the print queue is reached in step 182 and no further printing is performed. At any time during the operation, if proximity values exceed predetermined value as determined, the controller board 40 may send a signal (e.g., via indicators 20 seen in FIG. 1) to the operator at step 186.

Figure 20:
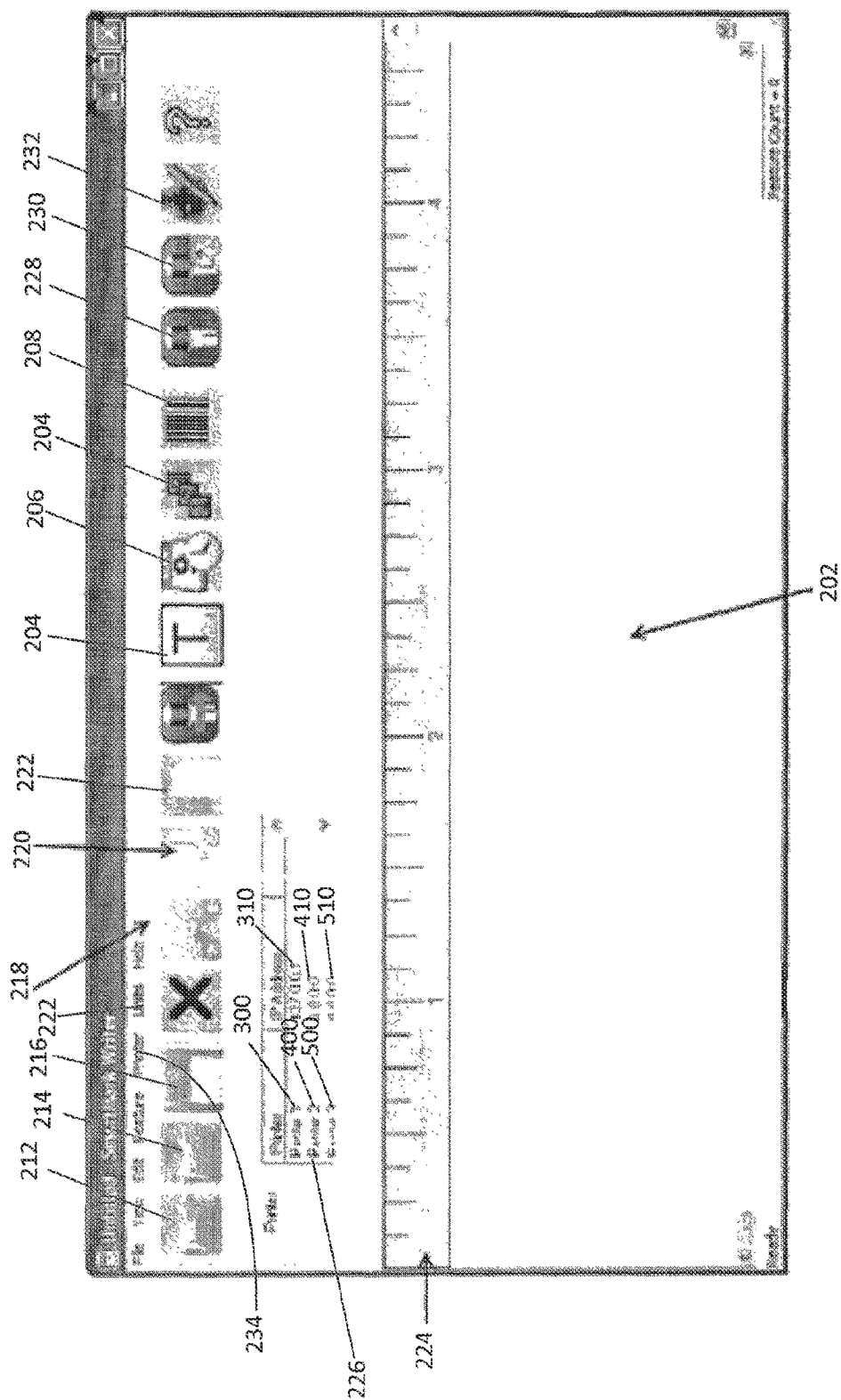
FIG. 20 is a schematic representation of a user interface for generating indicia for, and communicating with, tool assemblies in accordance with certain embodiments of the invention.

FIG. 20 shows an exemplary embodiment of a user interface 200 for communicating with the tool assembly 100'. As illustrated, the user interface 200 involves a workspace area or screen 202, e.g., formed via corresponding software/program/application run on computing device. In the case of the tool assembly 100' being utilized for printing indicia, the interface 200 can be used for viewing, creating or editing indicia; however, the user interface enables virtually limitless possibilities for an operator in controlling what, when, and how the tool assembly 100' is to operate. For instance, the user interface 200 can allow enable an operator to create, store, or view print jobs (e.g., via communication with communication board 42 of the tool assembly 100', as already described).

In certain embodiments as shown, the user interface 200 can include a plurality of buttons that enable an operator to control a wide variety of parameters relating to the function performed by functional head 25 of the tool assembly 100'. For instance, in the case of printing indicia and parameters therefor, a first button 204 can allow the operator to insert alphanumeric text in the workspace area 202. A second button 206 can allow the operator to insert current date and time in the workspace area 202. A third button 208 may allow the operator to insert a barcode in the workspace area 202. An additional button (not shown) may allow the operator to insert a part number (e.g., of a machined part in a product assembly line) in the workspace area 202. In certain embodiments, actuating the button may further allow the operator to view a record of available part numbers in a separate window (not shown). An additional button (not shown) may allow the operator to insert a digital signature, or a stamp (e.g., "APPROVED", "OK", "CAUTION" etc.) in the workspace area 202. An additional button (not shown) may print symbols or patterns (e.g., a check mark, a logo, an image, a computer icon etc.) in the workspace area 202. Other buttons 212, 214, 216, 218, 220 may perform standard word-processing functions (e.g., open, close, save, cut, copy, paste, minimize, maximize etc.). The user interface 200 may allow the indicia (text, barcode, QR code etc.) to be printed at desired font type, spacing, size and/or color. The user interface 200 may also allow the operator to configure speed, distance, and other parameters of printing in any unit system (e.g., metric or English units). To that end, dropdown menus may be accessed via the user interface 200, such as menu 222, which may allow the operator to select various units for representing distance or dimensions (e.g., in millimeters, inches, mils, centimeters etc.). A ruler area 224 may facilitate the operator in creating indicia of desired dimension and at a desired position.

With continued reference to FIG. 20, the user interface 200 may allow the operator to view the status of one tool assembly 100', or a plurality of such assemblies (with each differing assembly 100' exemplarily referenced as 300, 400, 500) on the screen 202. As mentioned previously, each tool assembly 100' (e.g., assemblies 300, 400, 500) may have a unique identifier 310, 410, 510 (e.g., network ID, IP address, name). The user interface 200 may display a list of available assemblies 100' and their identifiers in a list box 226. To that end, the operator can view the list and separately configure each tool assembly 100' with values or thresholds (e.g., concerning printing speed, proximity to workpiece at which printing must be initiated, etc.). Further, the operator can synchronize the tool assemblies 100' to have consistent date/time with the computing device. Additionally, the operator may send a signal to the controller board 40 of any tool assembly 100' to use a predetermined volume of ink during a printing operation (e.g., in order to conserve ink). Also, the user interface 200 may also allow the operator to send a print job to the tool assembly 100', and query the assembly 100' regarding the status of the print job, the level of ink in the ink cartridge, the status of the assembly 100' (e.g., ready state, connected state, fault state etc., or status with regard to booting up, purging, etc.). As should be appreciated, any plurality of buttons (further shown as buttons 228, 230, 232) or menu commands 234 can be provided in the user interface 200, or any number of buttons and/or menu commands may be programmed. In addition, the indicia and the configurations of the marking tool can be saved in the on-board memory 54 of the tool assembly 100' and/or the on-board memory of the computing device. While a dedicated user interface 200 has been illustrated in FIG. 20 and described, it should be appreciated that the functionality of the interface 200 (as it can be used in cooperating with the tool assembly 100') is nearly limitless, and capable of being run using any known word-processing software on a computing device (e.g., tablet or smartphone applications, or word-processing software on desktop or laptop computers).

Thus, embodiments of a MULTI-USE ACTIVE TOOL ASSEMBLY are disclosed. One skilled in the art will appreciate that the invention can be practiced with embodiments other than those disclosed. The disclosed embodiments are presented for purposes of illustration and not limitation, and the invention is limited only by the claims that follow.

What is claimed is:

1. A tool assembly configured for performing a function on an object, the tool assembly comprising:
    an active tool comprising:
        a microprocessor; and
        a functional head electrically coupled to the microprocessor;
    a power source being electrically coupled to the microprocessor for powering the functional head;
    a housing including a first portion and a second portion, the second portion containing the functional head, the first portion defined as an internal web that divides the first portion into a plurality of separate compartments, a first of the compartments accommodating the microprocessor, a second of the compartments sized to accommodate the power source, a third of the compartments sized to accommodate at least one item relating to operation of the functional head; and
    a plunger operably coupled to the first portion and selectively displaceable relative to the first portion in event of force applied to a surface of the plunger;
    wherein displacement of the plunger causes corresponding interfacing and thereby activation of the microprocessor; and
    wherein the second and third compartments are open to an exterior of the first portion, thereby defining respective recesses, the power source and the at least one item related to operation of the functional head are housed in separate cartridges that are selectively insertable within or removable from corresponding of the recesses.

2. The tool assembly of claim 1 wherein the first portion is a cylindrical shape, and wherein the separate cartridges are each wedge-shaped.

3. The tool assembly of claim 1 wherein the second and third compartments define a majority of open area of the first portion.

4. The tool assembly of claim 3 wherein the second and third compartments define at least 60% of the open area of the first portion.

5. The tool assembly of claim 1 wherein the plunger is resiliently biased so as to return to an original position away from the first portion upon removal of the force, thereby also halting the activation of the microprocessor.

6. The tool assembly of claim 1 wherein the second portion defines an opening on a distal end thereof, wherein the functional head is fixed at a position recessed within the opening and through which the functional head performs the function.

7. The tool assembly of claim 6 further comprising a proximity sensor positioned at the distal end of the second portion, wherein both conditions of activation of the microprocessor and predetermined proximity of the distal end of the second portion and the object must be met prior to the functional head performing an operation.

8. The tool assembly of claim 1 wherein the microprocessor is part of a controller board and is configured to receive programming instructions both directly and indirectly.

9. The tool assembly of claim 8 further comprising a user interface located on an outer surface of the first portion, wherein the user interface is electrically coupled to the microprocessor wherefrom the programming instructions can be received directly by the microprocessor.

10. The tool assembly of claim 9, wherein the user interface comprises a series of buttons and light indicators, wherein the buttons enable an operator to power the microprocessor and designate operations for the functional head via the microprocessor, and wherein the light indicators enable operation statuses of the assembly.

11. The tool assembly of claim 8 wherein the active tool further comprises a communications module coupled to the microprocessor, the communications module configured to receive wireless transmissions, wherefrom the programming instructions can be received indirectly by the microprocessor.

12. A tool assembly configured for performing a function on an object, the tool assembly comprising:
    an active tool comprising:
        a microprocessor; and
        a functional head electrically coupled to the microprocessor;
    a power source being electrically coupled to the microprocessor for powering the functional head; and
    a housing including a first portion and a second portion, the second portion containing the functional head, the first portion defined as an internal web that divides the first portion into a plurality of separate compartments, a first of the compartments accommodating the microprocessor, a second of the compartments sized to accommodate the power source, a third of the compartments sized to accommodate at least one item relating to operation of the functional head;
    wherein the second and third compartments are open to an exterior of the first portion, thereby defining respective recesses, the power source and the at least one item related to operation of the functional head are housed in separate cartridges that are selectively insertable within or removable from corresponding of the recesses;
    wherein the functional head is configured for printing, wherein the at least one item comprises ink, wherein corresponding one of the cartridges housing the ink is an ink cartridge with outlet port for ink further defined thereon; and
    further comprising an ink management module contained within the second portion, wherein the ink management module fluidly couples the ink cartridge and the functional head, and wherein the microprocessor is electrically coupled to the ink management module so as to regulate flow of the ink from the ink cartridge to the module.

13. The tool assembly of claim 12 wherein the ink management module comprises an ink reservoir, wherein when level of the ink in the reservoir is below a predetermined level, the microprocessor is configured to trigger the module so as to pump the ink from the ink cartridge to the module.

14. The tool assembly of claim 13 wherein the ink reservoir is operably coupled to the microprocessor via a pressure sensor, and wherein connection between the ink reservoir and the sensor is fluidly blocked by a sealing membrane, thereby preventing exposure of the sensor to the ink within the reservoir regardless of orientation of the module.

15. The tool assembly of claim 14 wherein the sealing membrane is formed in a sheet and sandwiched between two operably coupled bodies of the module, wherein the ink reservoir and the pressure sensor are correspondingly contained within or operably coupled to a separate one of the bodies.

16. A tool assembly configured for performing a function on an object, the tool assembly comprising:
   an active tool comprising:
      a microprocessor;
      a functional head electrically coupled to the microprocessor; and
      a communications module electrically coupled to the microprocessor, the communications module configured to communicate wirelessly;
   a power source being electrically coupled to the microprocessor for powering the functional head;
   a housing containing the microprocessor, the communications module, the power source, and the functional head; and
   a user interface located on an outer surface of the first portion and electrically coupled to the microprocessor;
   wherein the microprocessor is configured to receive programming instructions both directly from the user interface and indirectly from the communications module and
   further comprising a plunger operably coupled to the housing and selectively displaceable relative to the housing in event of force applied to a surface of the plunger, wherein displacement of the plunger causes corresponding interfacing and thereby activation of the microprocessor.

17. The tool assembly of claim 16 wherein the user interface comprises a series of buttons and light indicators, wherein the buttons enable an operator to power the microprocessor and designate operations for the functional head via the microprocessor, and wherein the light indicators enable operation statuses of the assembly.

18. The tool assembly of claim 16 wherein the housing includes a first portion and a second portion, wherein the first portion accommodates the microprocessor, the communications module, and the power source, and wherein the second portion contains the functional head.

19. The tool assembly of claim 18 wherein the functional head is configured for printing, and wherein an ink source is further accommodated by the first portion.

20. The tool assembly of claim 19 further comprising an ink management module contained by the second portion, wherein the ink management module fluidly couples the ink source and the functional head, and wherein the microprocessor is electrically coupled to the ink management module so as to regulate flow of ink from the ink source to the module.

21. The tool assembly of claim 20 wherein the ink management module comprises an ink reservoir, wherein when level of the ink in the reservoir is below a predetermined level, the microprocessor is configured to trigger the module so as to pump the ink from the ink source to the module.

22. The tool assembly of claim 21 wherein the ink reservoir is operably coupled to the microprocessor via a pressure sensor, and wherein connection between the ink reservoir and the sensor is fluidly blocked by a sealing membrane, thereby preventing exposure of the sensor to the ink within the reservoir regardless of orientation of the module.

23. The tool assembly of claim 22 wherein the sealing membrane is formed in a sheet and sandwiched between two operably coupled bodies of the module, wherein the ink reservoir and the pressure sensor are correspondingly contained within or operably coupled to a separate one of the bodies.

24. The tool assembly of claim 18 further comprising a proximity sensor positioned at a distal end of the second portion, wherein both conditions of activation of the microprocessor and predetermined proximity of the distal end of the second portion and the object must be met prior to the functional head performing an operation.

25. A tool assembly configured for performing a printing operation on an object, the tool assembly comprising:
   an active tool comprising:
      a microprocessor; and
      a functional head electrically coupled to the microprocessor and configured for printing;
   a power source being electrically coupled to the microprocessor for powering the functional head;
   an ink source housed in a cartridge;
   a housing containing the microprocessor, the communications module, the power source, and the functional head, the housing defining a recess in an outer wall in which the cartridge is selectively insertable within or removable from; and
   an ink management module contained within the housing and fluidly coupling the ink source and the functional head, and wherein the microprocessor is electrically coupled to the ink management module so as to regulate flow of ink from the ink source to the module.

26. The tool assembly of claim 25 wherein the ink management module comprises an ink reservoir, wherein when level of the ink in the reservoir is below a predetermined level, the microprocessor is configured to trigger the module so as to pump the ink from the ink source to the module.

27. The tool assembly of claim 26 wherein the ink management module comprises an actuator, wherein the actuator is triggered by the microprocessor so as to pump the ink from the ink source, and wherein the actuator comprises a piston and piston chamber, whereby the piston chamber intersects fluid connection between the ink source and the ink reservoir such that a portion of the ink is pulled from the ink source during a retraction stroke of the piston within the chamber and said portion of ink is further forced into the ink reservoir via subsequent delivery stroke of the piston within the chamber.

28. The tool assembly of claim 26 wherein the ink reservoir is operably coupled to the microprocessor via a pressure sensor, and wherein connection between the ink reservoir and the sensor is fluidly blocked by a sealing membrane, thereby preventing exposure of the sensor to the ink within the reservoir regardless of orientation of the module.

29. The tool assembly of claim 28 wherein the sealing membrane is formed in a sheet and sandwiched between two operably coupled bodies of the module, wherein the ink reservoir and the pressure sensor are correspondingly contained within or operably coupled to a separate one of the bodies.

30. The tool assembly of claim 29 wherein the sealing membrane is formed of rubber or a synthetic polymer material, and has thickness in range between about 0.001" and about 0.015".

31. The tool assembly of claim 25 wherein the microprocessor is part of a controller board and is configured to receive programming instructions both directly and indirectly.

32. The tool assembly of claim 31 further comprising a user interface located on an outer surface of the housing, wherein the user interface is electrically coupled to the microprocessor wherefrom the programming instructions can be received directly by the microprocessor.

33. The tool assembly of claim 31 wherein the active tool further comprises a communications module coupled to the microprocessor, the communications module configured to receive wireless transmissions, wherefrom the programming instructions can be received indirectly by the microprocessor.

34. The tool assembly of claim 25, wherein the housing includes a first portion and a second portion, wherein the first portion accommodates the microprocessor, the communications module, the power source, and the ink source, and wherein the second portion contains the functional head.

35. A method of performing a function on an object via a tool assembly, whereby the tool assembly is manually operated by a user, the method comprising the steps of:
providing a tool assembly that comprises:
an active tool comprising a microprocessor and a functional head electrically coupled to the microprocessor;
a power source electrically coupled to the microprocessor;
a housing including a first portion and a second portion, the first portion accommodating the microprocessor and the power source, the second portion accommodating the functional head;
a user interface located on an outer surface of the first portion and electrically coupled to the microprocessor; and
a plunger operably coupled to the first portion and selectively displaceable relative to the first portion in event of force applied to a surface of the plunger; and
interfacing the user interface so as to power the microprocessor;
applying a force on the plunger such that the plunger moves relative to the first portion and interfaces with and thereby activates the microprocessor; and
moving a distal end of the second portion within predetermined proximity of the object.

36. The method of claim 35 wherein the tool assembly further comprises a proximity sensor positioned at the distal end of the second portion and electrically coupled to the microprocessor, whereby microprocessor actuates the functional head to perform the function when the sensor is brought within the predetermined proximity of the object.

37. The method of claim 35 wherein the functional head is configured for performing a printing function, and the tool assembly further comprises an ink source accommodated by the first portion and fluidly connected to the functional head, whereby flow of ink from the ink source to the functional head is regulated by the microprocessor during printing function.

38. The method of claim 37 wherein the tool assembly further comprises an ink management module contained within the second portion and fluidly coupling the ink source and the functional head, and wherein the microprocessor is electrically coupled to the ink management module and able to trigger the module to pump portion of the ink from the ink source.

39. The method of claim 35 wherein the ink management module comprises an ink reservoir operably coupled to the microprocessor via a pressure sensor, wherein when level of the ink in the reservoir is below a predetermined level, the microprocessor is signaled by sensor to trigger the module so as to pump the ink from the ink source to the module, and wherein connection between the ink reservoir and the sensor is fluidly blocked by a sealing membrane, thereby preventing exposure of the sensor to the ink within the reservoir regardless of orientation of the module.

40. A tool assembly configured for performing a function on an object, the tool assembly comprising:
an active tool comprising:
a microprocessor; and
a functional head electrically coupled to the microprocessor;
a power source being electrically coupled to the microprocessor for powering the functional head; and
a housing including a first portion and a second portion, the first portion defining a plurality of compartments for accommodating the microprocessor and the power source and at least one item relating to operation of the functional head, the second portion containing the functional head;
wherein two of the compartments are defined as recesses in an outer wall of the first portion so as to open outward from the first portion, the power source and the at least one item related to operation of the functional head are housed in separate cartridges that are selectively insertable within or removable from corresponding of the recesses.

41. The tool assembly of claim 40 wherein the functional head is configured for printing, wherein the at least one item comprises ink, wherein corresponding one of the cartridges housing the ink is an ink cartridge with outlet port for ink further defined thereon.

42. The tool assembly of claim 40 further comprising a plunger operably coupled to the first portion and selectively displaceable relative to the first portion in event of force applied to a surface of the plunger, wherein displacement of the plunger causes corresponding interfacing and thereby activation of the microprocessor.

* * * * *